United States Patent
Morikuni et al.

(10) Patent No.: US 8,434,878 B2
(45) Date of Patent: May 7, 2013

(54) PROXIMITY PROJECTOR WITH A TRANSMISSIVE COVER WITH MODIFIED REFLECTANCE PROPERTIES

(75) Inventors: Eiji Morikuni, Shiojiri (JP); Nobutaka Minefuji, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 595 days.

(21) Appl. No.: 12/642,280

(22) Filed: Dec. 18, 2009

(65) Prior Publication Data

US 2010/0165308 A1    Jul. 1, 2010

(30) Foreign Application Priority Data

Dec. 26, 2008  (JP) ................................. 2008-332966
Dec. 26, 2008  (JP) ................................. 2008-332967

(51) Int. Cl.
G03B 21/28 (2006.01)
G03B 21/14 (2006.01)

(52) U.S. Cl.
USPC .............................................. 353/98; 353/119

(58) Field of Classification Search .................... 353/98, 353/119, 37, 50, 51, 77–79, 99, 94; 359/871–895, 359/838; 352/242, 243
See application file for complete search history.

(56) References Cited

U.S. PATENT DOCUMENTS

| | | | | |
|---|---|---|---|---|
| 6,407,859 B1 * | 6/2002 | Hennen et al. | ................. | 359/454 |
| 7,093,943 B2 * | 8/2006 | Kobayashi et al. | ........... | 353/122 |
| 7,562,983 B2 * | 7/2009 | Kim et al. | ........................ | 353/10 |
| 7,614,749 B2 * | 11/2009 | Vrachan et al. | ................. | 353/10 |
| 2004/0085637 A1 * | 5/2004 | Ikari et al. | ..................... | 359/457 |
| 2008/0037117 A1 * | 2/2008 | Seki et al. | ..................... | 359/446 |
| 2011/0063580 A1 * | 3/2011 | Amano et al. | .................. | 353/20 |

FOREIGN PATENT DOCUMENTS

| | | |
|---|---|---|
| JP | 2004-012749 | 1/2004 |
| JP | 2008-107801 | 5/2008 |
| JP | 2008-522229 | 6/2008 |
| JP | 2008-165202 | 7/2008 |

* cited by examiner

*Primary Examiner* — Pascal M Bui Pho

(74) *Attorney, Agent, or Firm* — Maschoff Brennan

(57) ABSTRACT

A projector includes: a projection unit that projects projection light toward an illuminated surface; a housing that houses the projection unit and has an opening that allows the projection light to exit outward; and a cover portion that blocks the opening and transmits the projection light, wherein a plurality of areas is set in the cover portion relative to the projection unit, and a process of changing the reflectance of the light-incident surface of the cover portion at which the projection light is reflected is performed on each of the areas.

17 Claims, 24 Drawing Sheets

PROXIMITY PROJECTOR WITH A TRANSMISSIVE COVER WITH MODIFIED REFLECTANCE PROPERTIES

BACKGROUND

1. Technical Field

The present invention relates a projector, and particularly to a technology of a projector including a cover portion that protects a projection unit.

2. Related Art

A projector that projects light on a screen to display an image includes a light projection system in a housing. The performance of the projection system is significantly degraded in some cases due to dust, dirt, and other factors. To protect the projection system from dust and dirt, a configuration in which the housing includes a light-transmissive cover portion has been proposed (see JP-A-2004-12749, JP-T-2008-522229, JP-A-2008-107801, and JP-A-2008-165202, for example).

Most of the light projected from the projection system passes through the cover portion and is projected on the screen, but part of the light is reflected off the light-incident surface of the cover portion. The ratio of the amount of light reflected off the cover portion to the total amount of light incident thereon, that is, the reflectance, varies with the angle of incidence of the light that impinges on the light-incident surface. The reflectance of the light-incident surface increases as the angle of incidence increases. The light projected from the projection system may impinge on the light-incident surface at a variety of angles. When the reflectance increases, the amount of light that can reach the screen decreases, and the image brightness decreases accordingly. Therefore, among the projection light incident on the cover portion, the projection light incident at a large angle of incidence disadvantageously forms an image having reduced brightness.

To reduce the amount of reflection off the light-incident surface, it is conceivable to form an anti-reflection film (AR coating) over the light-incident surface of the cover portion. In this case, however, a significantly large number of coating layers is required to achieve an anti-reflection capability across a wide range of angle of incidence, resulting in increase in cost.

On the other hand, there is what is called a proximity projection-type projector capable of projecting wide-angle light from a position close to a screen. Since a proximity projection-type projector uses wide-angle light, the range of the angle of incidence of the light incident on the cover portion increases, and hence the projection light tends to be incident at a large angle of incidence. Therefore, a proximity projection-type projector, in particular, suffers from significant reduction in image brightness due to the angle of incidence of the light incident on the cover portion.

SUMMARY

An advantage of some aspects of the invention is to provide a projector including a cover portion capable of protecting a projection system and reducing the loss of light due to the reflection off the light-incident surface of the cover portion to prevent reduction in image brightness at a low cost.

A projector according to an aspect of the invention includes a projection unit that projects projection light toward an illuminated surface, a housing that houses the projection unit and has an opening that allows the projection light to exit outward, and a cover portion that blocks the opening and transmits the projection light. A plurality of areas is set in the cover portion relative to the projection unit, and a process of changing the reflectance of the light-incident surface of the cover portion at which the projection light is reflected is performed on each of the areas.

Since a plurality of areas is set in the cover portion and a process of changing the reflectance of the light-incident surface of the cover portion at which the projection light is reflected is performed on each of the areas, the amount of reflection off the light-incident surface of the cover portion can be reduced. When the amount of reflection off the light-incident surface is reduced, the loss due to the reflection and hence decrease in image brightness can be reduced.

In the projector including a projection unit that projects projection light toward an illuminated surface, a housing that houses the projection unit and has an opening that allows the projection light to exit outward, and a cover portion that blocks the opening and transmits the projection light, it is preferable that a plurality of areas is set on the projection light-incident surface of the cover portion based on the angle of incidence of the projection light, and an anti-reflection process according to the angle of incidence of the projection light is performed on each of the areas.

Since a plurality of areas is set on the light-incident surface of the cover portion and an anti-reflection process according to the angle of incidence of the projection light is performed on each of the areas, the amount of reflection off the light-incident surface of the cover portion can be reduced. When the amount of reflection off the light-incident surface is reduced, the loss due to the reflection and hence the decrease in image brightness can be reduced. Further, since a process according to the angle of incidence is performed on each of the areas, it is not necessary to form a multilayer coating film on the entire light-incident surface to achieve an anti-reflection effect across a wide range of angle of incidence. The manufacturing cost can therefore be reduced. The angle of incidence used herein is the angle between a normal to the light-incident surface in the position where a projection light ray of interest is incident and the projection light ray.

It is preferable that one of the plurality of areas is set as a reference area on which a process of preventing the reflection of the projection light incident at an angle of incidence within a predetermined range is performed, and a process of preventing the reflection of the projection light incident at a larger angle of incidence is performed on an area spaced further apart from the reference area.

For example, when the projection light radially propagates, the angle of incidence of the projection light increases with the distance from the location on the light-incident surface of the cover portion where the projection light is incident at the smallest angle of incidence. In this case, when a process of preventing the reflection of the projection light incident at a larger angle of incidence is performed on an area spaced further apart from the reference area and the projection light is incident on the reference area at the smallest angle of incidence, the reflection off the light-incident surface and hence the decrease in image brightness can be effectively reduced.

It is preferable that the cover portion has a substantially rectangular shape in the plan view and the plurality of areas is formed by dividing the light-incident surface into three in the longitudinal direction of the substantially rectangular shape. In this case, the reference area is preferably the central area of the plurality of areas in the longitudinal direction.

Dividing the light-incident surface into a large number of small areas in accordance with the angle of incidence of the projection light allows the amount of projection light that passes through the light-incident surface and reaches the illuminated surface to be increased. In this case, however, the anti-reflection and other processes are complicated, and the cost disadvantageously increases. In the case described above, since the light-incident surface is divided into three areas, which correspond to the plurality of areas described above, the anti-reflection process is simplified and hence the cost can be reduced as compared to a case where the light-incident surface is divided into a large number of areas.

It is preferable that the cover portion has a substantially rectangular shape in the plan view and the plurality of areas is formed by dividing the light-incident surface into two in the short-side direction of the substantially rectangular shape. In this case, a process of preventing the reflection of the projection light incident at an angle of incidence within a predetermined range is preferably performed on one of the areas, and a process of preventing the reflection of the projection light incident at an angle of incidence beyond the predetermined range is preferably performed on the other one of the areas.

Dividing the light-incident surface into a large number of small areas in accordance with the angle of incidence of the projection light allows the amount of projection light that passes through the light-incident surface and reaches the illuminated surface to be increased. In this case, however, the anti-reflection and other processes are complicated, and the cost disadvantageously increases. In the case described above, since the light-incident surface is divided into two areas, which correspond to the plurality of areas described above, the anti-reflection process is simplified and hence the cost can be reduced as compared to a case where the light-incident surface is divided into a large number of areas. In particular, the area setting described above is effective when the light projected on an image portion where the brightness does not decrease is incident only on one of the areas in the short-side direction of the cover portion and the light projected on another image portion where the brightness significantly decreases is incident only on the other one of the areas.

Further, since the light-incident surface is divided into two areas in the short-side direction, for example, arranging a plurality of cover portions in the longitudinal direction allows anti-reflection processes to be performed on the plurality of cover portions at the same time. In this way, a large number of cover portions can be produced in a fewer steps, and the cover portions can be more efficiently manufactured. Alternatively, for example, a substrate in which cover portions are successively connected in the longitudinal direction is prepared. The substrate is divided into two areas in the short-side direction, and anti-reflection processes are performed. The processed substrate is then cut in accordance with the longitudinal dimension of the cover portion. A large number of cover portions can thus readily be manufactured. In this way, a large number of cover portions can be produced in a fewer steps, and the cover portions can be more efficiently manufactured.

It is preferable that the process of preventing the reflection of the projection light is forming an anti-reflection film on the light-incident surface. An anti-reflection process according to the angle of incidence of the projection light incident on each of the areas can be performed on each of the areas by forming an anti-reflection film.

It is preferable that the anti-reflection films overlap with each other at the boundary between adjacent ones of the areas. The overlap between the anti-reflection films at the boundary between adjacent ones of the areas allows the brightness of an image displayed on the illuminated surface to change smoothly and hence prevents a viewer from recognizing the boundary between the areas.

It is preferable that the projection unit includes a wide-angle light forming reflector that converts the projection light into wide-angle light. Since a projector including a wide-angle light forming reflector, that is, a proximity projection-type projector, uses wide-angle light, the projector tends to produce projection light incident at a large angle of incidence and hence loose part of the projection light due to reflection. In the case described above, since an anti-reflection process according to the angle of incidence is performed on each of the areas of the cover portion, the loss due to the reflection and hence decrease in image brightness can be reduced.

In the projector including a projection unit that projects projection light toward an illuminated surface, a housing that houses the projection unit and has an opening that allows the projection light to exit outward, and a cover portion that blocks the opening and transmits the projection light, it is preferable that the cover portion has a substantially uniform thickness and includes a central portion and peripheral portions adjacent to the central portion, and the peripheral portions are bent toward the side where the projection light is incident.

Since the peripheral areas are bent toward the side where the projection light is incident, the angle of incidence of the projection light, for example, when it radially propagates, in the peripheral portions can be reduced as compared to a case where the cover portion has an entirely flat single light-incident surface. When the angle of incidence decreases, the reflectance at which the projection light incident on the peripheral portions is reflected can be reduced, and hence the loss due to the reflection off the light-incident surface of the cover portion can be reduced. Therefore, the cover portion can not only protect the projection unit from dust and dirt but also, for example, prevent the decrease in brightness of an image displayed on a screen, which is the illuminated surface. The cover portion is configured not to have a lens function by forming it to have a substantially uniform thickness. When the cover portion has no lens function, a slight positional error in a process of attaching the cover portion does not greatly affect the quality of a displayed image. This allows the assembly cost to be reduced and further allows the cover portion to be readily exchanged, whereby ease of maintenance of the projector can be improved. The angle of incidence used herein is the angle between a normal to the light-incident surface in the position where a projection light ray of interest is incident and the projection light ray.

It is preferable that the central portion is formed of a flat surface. Since the central portion is formed of a flat surface, the manufacturing cost can be reduced as compared to a case where a curved surface is used. Further, since the projection light is incident on the central portion of the cover portion at a small angle of incidence in a projector in many cases, a problem of the decrease in image brightness will unlikely occur even when the central portion is formed of a flat surface.

It is preferable that each of the peripheral portions is formed of a flat surface. No process of forming a curved surface needs to be performed on each of the peripheral portions, whereby the manufacturing cost can further be reduced. Bending a flat member along the boundary between the central portion and each of the peripheral portions can form a bent cover portion formed of a flat central portion and flat peripheral portions. Even when each of the peripheral portions is formed of a flat surface, bending the cover portion along the boundaries allows the reflectance to decrease to a level at which the viewer does not sense decrease in the amount of light, whereby decrease in image brightness can be reduced.

It is preferable that the central portion has a substantially rectangular shape in the plan view, and the peripheral portions are connected only to a pair of sides of the central portion that face each other. Since the peripheral portions are connected only to a pair of sides of the central portion that face each other, the cover portion can be manufactured only by bending both sides of a flat plate having entirely flat surface, whereby the manufacturing cost can be reduced.

It is preferable that the central portion is substantially parallel to a predetermined flat surface of the outer surfaces of the housing. Since the central portion is substantially parallel to a predetermined flat surface of the outer surfaces of the housing, the projector can be designed with no constraint and the degree of design freedom can be increased as compared to, for example, a case where a dome-shaped cover portion is employed. Further, when the central portion is completely flush with the predetermined outer surface of the housing, the degree of design freedom can be increased, and the cover portion can be integrated with the housing. Integrating the cover portion with the housing contributes to cost reduction because the number of assembly steps and the number of parts are reduced. When the cover portion is integrated with the housing, only the cover portion can transmit light by forming the entire structure with a transparent member and painting the portion other than the cover portion.

It is preferable that each of the peripheral portions is substantially parallel to a predetermined flat surface of the outer surfaces of the housing. Since each of the peripheral portions is substantially parallel to a predetermined flat surface of the outer surfaces of the housing, the projector can be designed with no constraint and the degree of design freedom can be increased as compared to, for example, a case where a dome-shaped cover portion is employed. Further, when each of the peripheral portions is completely flush with the predetermined outer surface of the housing, the degree of design freedom can be increased, and the cover portion can be integrated with the housing. Integrating the cover portion with the housing contributes to cost reduction because the number of assembly steps and the number of parts are reduced. When the cover portion is integrated with the housing, only the cover portion can transmit light by forming the entire structure with a transparent member and painting the portion other than the cover portion.

It is preferable that the projection unit includes a wide-angle light forming reflector that forms wide-angle light. In a projector including a wide-angle light forming reflector, that is, a proximity projection-type projector, when combined with a cover portion of related art, the reflection off the light-incident surface of the cover portion significantly reduces image brightness. The cover portion according to the aspect of the invention having bent peripheral portions can reduce the angle of incidence of the projection light, reduces the reflectance of the light-incident surface at which the projection light is reflected, and prevents decrease in image brightness.

It is preferable that the cover portion is inclined in such a way that the surface of the central portion through which the projection light exits faces the illuminated surface. Since a proximity projection-type projector is installed below the screen, the projection light exits through a top portion of the housing and travels toward the screen obliquely to some extent. Since the projection light is thus inclined, the angle of incidence of the projection light incident on the light-incident surface of the cover portion increases. Since the cover portion according to the case described above is inclined in such a way that the surface through which the projection light exits faces the screen, the inclination of the cover portion can cancel the increase in the angle of incidence of the projection light incident on the light-incident surface of the cover portion due to the inclination of the projection light. Therefore, simply inclining the cover portion can prevent the decrease in image brightness.

It is preferable that the peripheral portions are bent and inclined to the central portion by approximately 90 degrees. Since the peripheral portions are bent and inclined to the central portion by approximately 90 degrees, the cover portion can be a compact structure in which only small overhangs jut out from the central portion in the plan view. This structure also contributes to the compactness of the projector. In a proximity projection-type projector, in particular, the wide-angle projection light requires a large, wide cover portion to transmit all the projection light when the cover portion is entirely flat. In the case described above, since the peripheral portions are bent and inclined to the central portion by approximately 90 degrees, all the projection light can be transmitted and the cover portion can be compact at the same time.

BRIEF DESCRIPTION OF THE DRAWINGS

The invention will be described with reference to the accompanying drawings, wherein like numbers refer to like elements.

DESCRIPTION OF EXEMPLARY EMBODIMENTS

Figure 1:
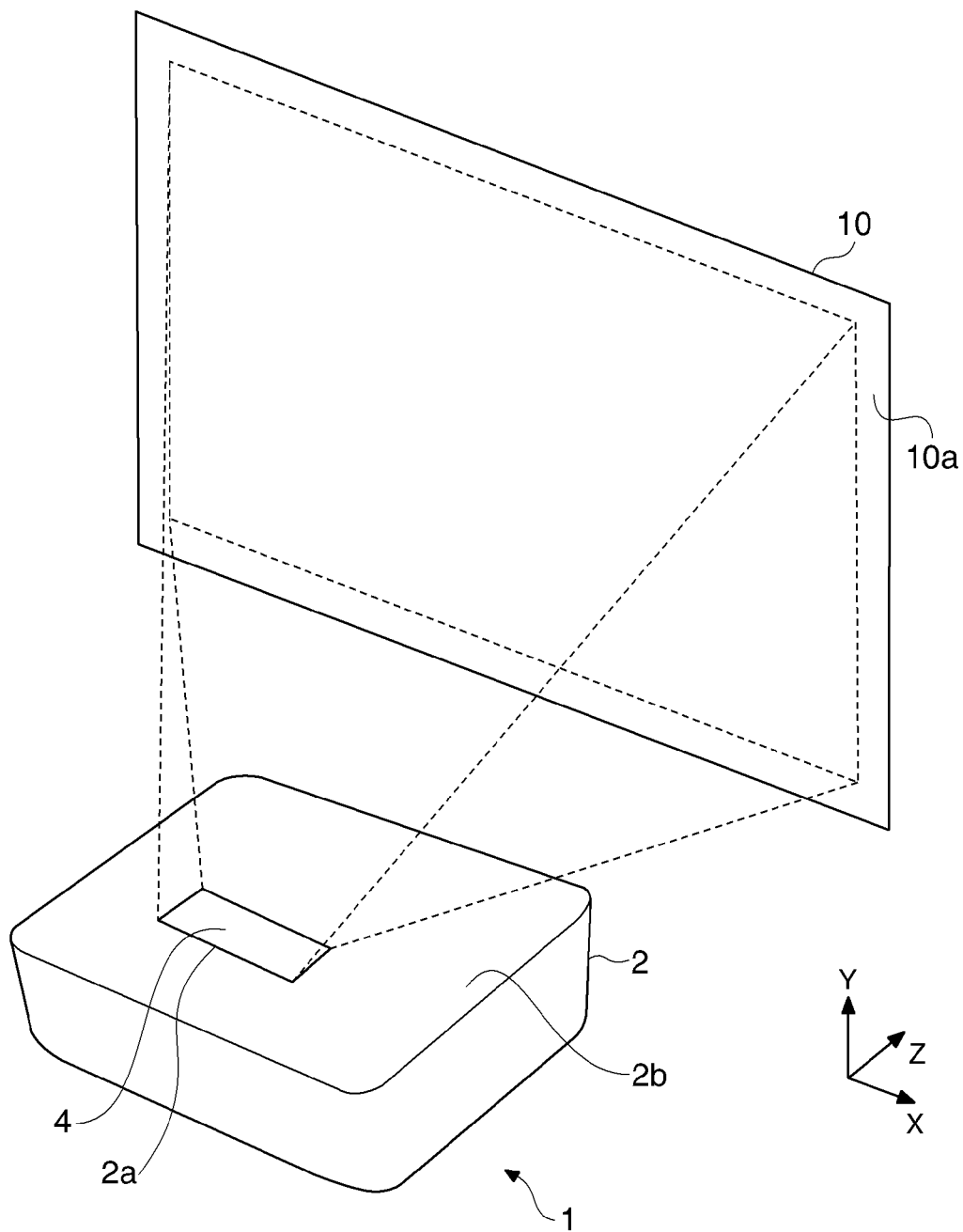
FIG. 1 is a perspective view showing how a projector according to a first embodiment is used.
Figure 2:
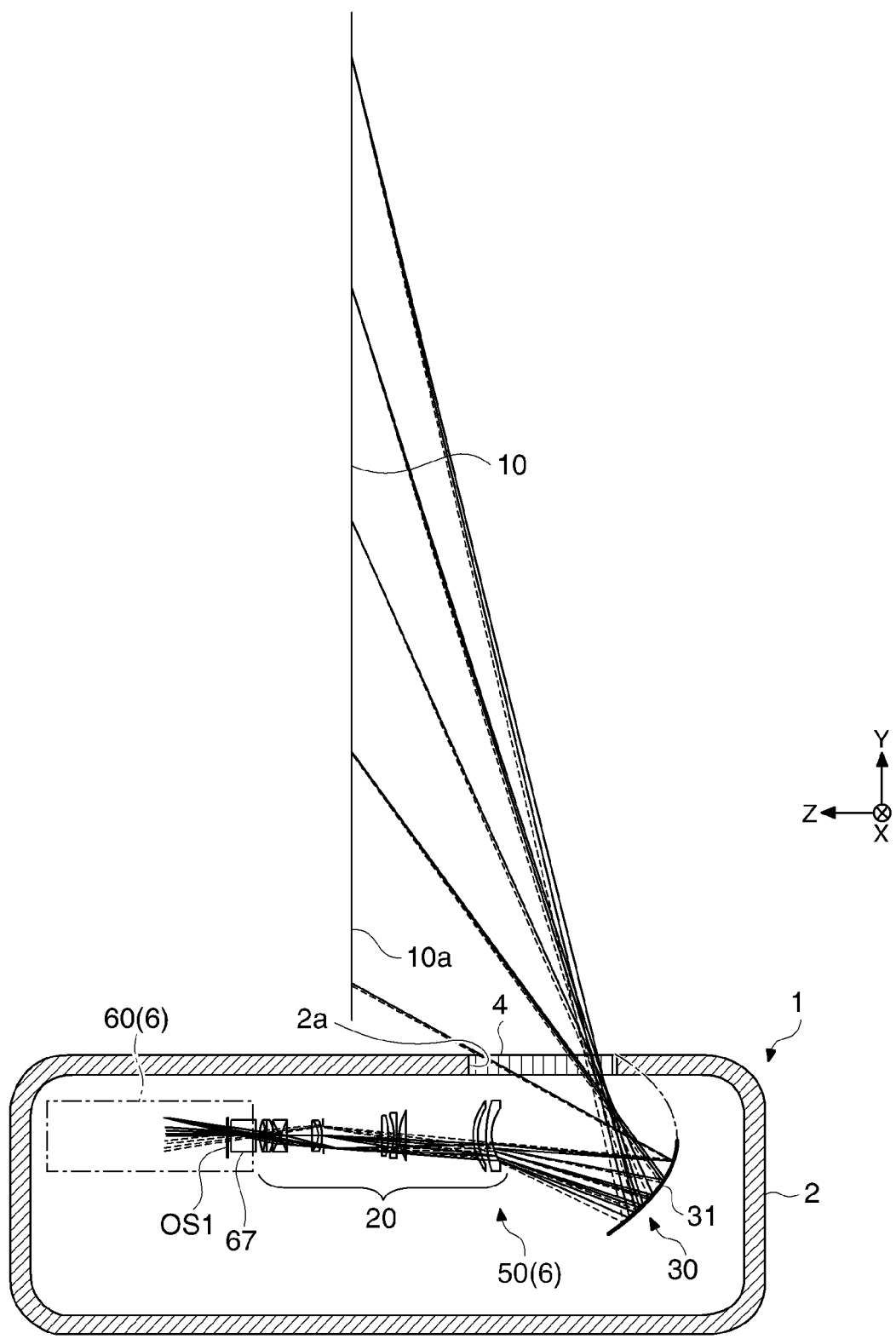
FIG. 2 is a transverse cross-sectional view showing a schematic configuration of the interior of the projector in the first embodiment.
Figure 3:
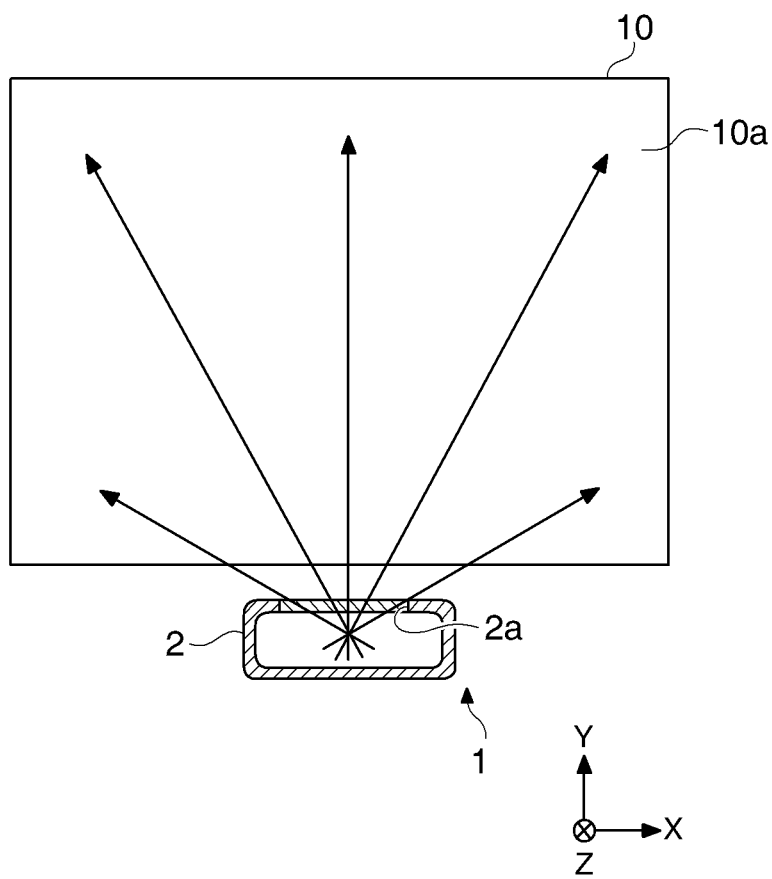
FIG. 3 is a front cross-sectional view but does not show the interior configuration of the projector in the first embodiment.

Embodiments of the invention will be described below in detail with reference to the drawings.
First Embodiment FIG. 1 is a perspective view showing how a projector according to a first embodiment of the invention is used. FIG. 2 is a transverse cross-sectional view showing a schematic configuration of the interior of the projector. FIG. 3 is a front cross-sectional view but does not show the interior configuration of the projector. The projector 1 is a front projection-type projector that projects projection light on a screen 10 to display an image. A viewer observes the image displayed on the screen 10. The projector 1 is a proximity projection-type projector that is positioned in the vicinity of the screen 10 and projects wide-angle projection light on the screen 10 to display an image.

The screen 10 is a reflective projection plate and diffuses and reflects the light incident on a front-side screen projection surface (illuminated surface) 10a to display an image. The axis along a normal to the screen projection surface 10a is called a Z axis. The axes perpendicular to the Z axis and intersecting each other at right angles are called an X axis and a Y axis.

The projector 1 generally includes a housing 2, a dust-proof cover (cover portion) 4, and a projection unit 6. The projection unit 6 is housed in the housing 2. Among the components described above, the projection unit 6 will first be described. The projection unit 6 includes a projection system 50 and an image formation optical unit 60.

The projection system 50 enlarges and projects an image on an object plane OS1 onto the screen projection surface 10a of the screen 10. The projection system 50 includes a refraction optical unit 20 and a reflection optical unit (wide-angle light forming reflector) 30. The refraction optical unit 20 is formed of a plurality of lenses, and the reflection optical unit 30 has at least one concave reflection surface.

Figure 4:
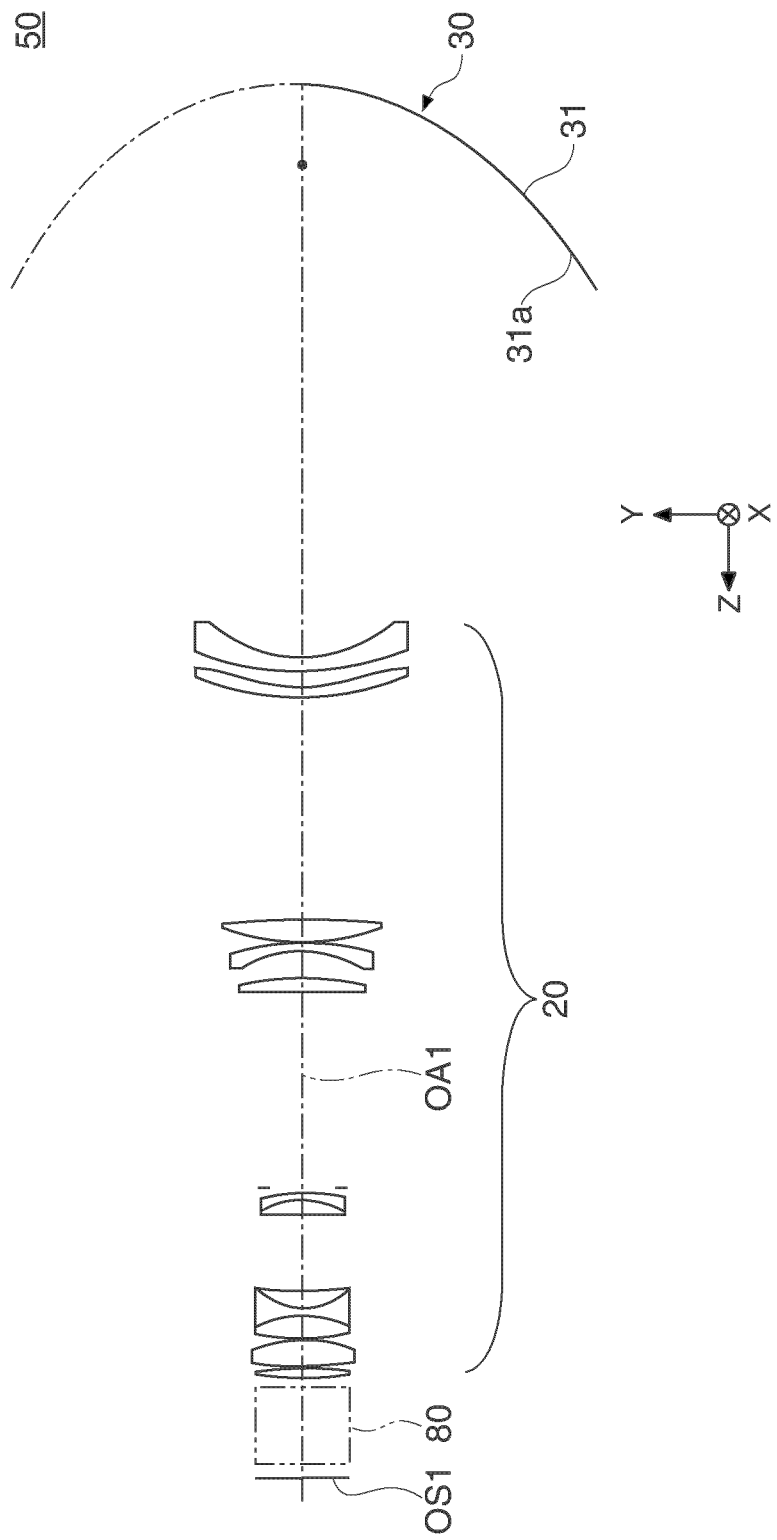
FIG. 4 describes a schematic configuration of a projection system in the first embodiment.

FIG. 4 describes a schematic configuration of the projection system 50. The refraction optical unit 20 is formed of a plurality of refractive lenses disposed below the screen 10 shown in FIG. 2 and along an optical axis OA1 extending in the direction perpendicular to the screen projection surface 10a. The lenses are arranged between the object plane OS1 and the reflection optical unit 30. Each of the lenses has rotational symmetry about the optical axis OA1. Alternatively, all or part of the lenses may have rotational asymmetry. The arrangement of the lenses is adjusted in such a way that projection onto the screen 10 can be optimized in consideration of the shapes and arrangements of the reflection optical unit 30 and other components. The optical axis OA1 does not necessarily extend in the direction perpendicular to the screen projection surface 10a. Further, all or part of the lenses may not share a single optical axis.

Each object point on the object plane OS1 emits a light flux that uniformly diverges from the principal ray, which is perpendicular to the object plane OS1 and parallel to the optical axis OA1. Each of the light fluxes emitted from the object plane OS1 passes through the refraction optical unit 20, is reflected off the reflection optical unit 30 provided below the optical axis OA1 and converted into radial projection light, and is projected on the screen 10.

The reflection optical unit 30 is formed of a single curved mirror 31. The curved mirror 31 is a concave reflection mirror formed of a surface rotationally symmetric about the optical axis OA1. The curved mirror 31 has an aspheric reflective optical surface 31a below the optical axis OA1, that is, on the opposite side of the optical axis OA1 with respect to the screen 10, and reflects the light fluxes having passed through the refraction optical unit 20 toward the screen projection surface 10a of the screen 10. The light fluxes having passed through the refraction optical unit 20 are reflected off the curved mirror 31, which is a concave reflection mirror, and first converge but then diverge. That is, the curved mirror 31 serves to form wide-angle projection light. While the projection system 50 is formed of the refraction optical unit 20 and the reflection optical unit 30 in the above description, the projection system 50 may alternatively be formed only of a refraction optical unit or a reflection optical unit having a power.

Figure 5:
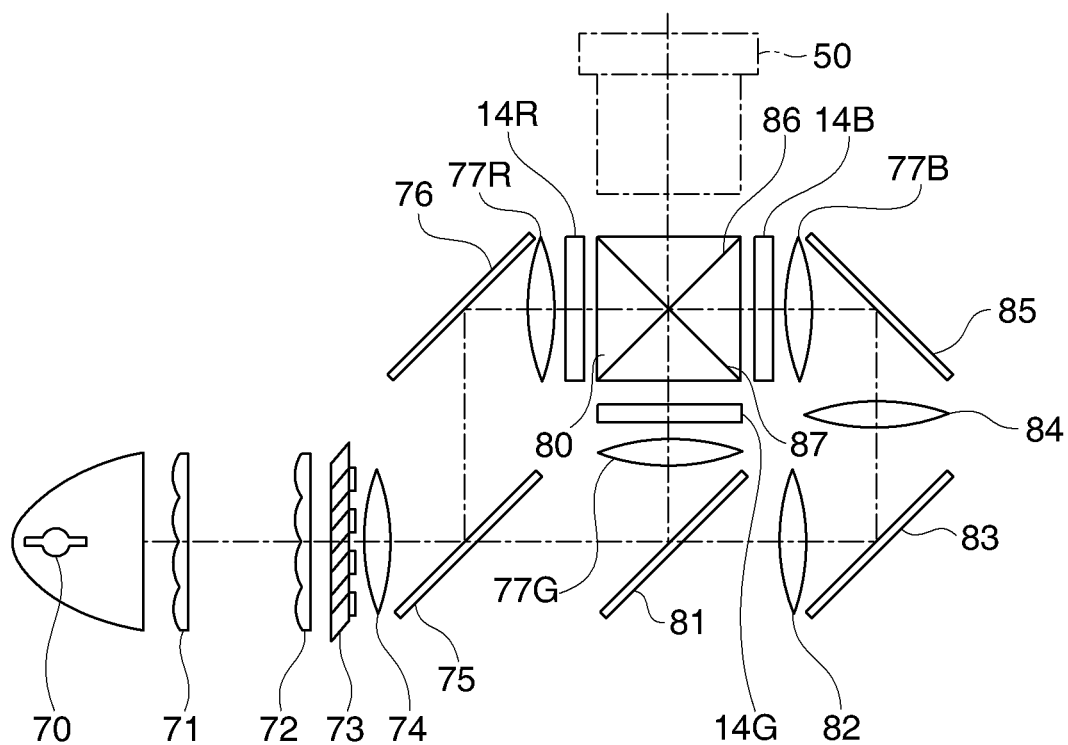
FIG. 5 shows a schematic configuration of an image formation optical unit in the first embodiment.

The image formation optical unit 60 will next be described. FIG. 5 shows a schematic configuration of the image formation optical unit 60. An arc tube 70 is a light source that emits light containing red (R) light, green (G) light, and blue (B) light. The arc tube 70 is, for example, an ultrahigh-pressure mercury lamp.

A first integrator lens 71 and a second integrator lens 72 are arrays of a plurality of lens elements. The first integrator lens 71 divides the light flux from the arc tube 70 into a plurality of sub-light fluxes. Each of the lens elements in the first integrator lens 71 focuses the light flux from the arc tube 70 in the vicinity of the corresponding lens element in the second integrator lens 72. Each of the lens elements in the second integrator lens 72 forms the image of the corresponding lens element in the first integrator lens 71 on spatial light modulators.

The light having passed through the two integrator lenses 71 and 72 is converted by a polarization conversion element 73 into light linearly polarized in a specific oscillation direction. A superimposing lens 74 superimposes the images of the lens elements in the first integrator lens 71 on the spatial light modulators. The first integrator lens 71, the second integrator lens 72, and the superimposing lens 74 make the intensity distribution of the light from the arc tube 70 uniform on the spatial light modulators. The light having passed through the superimposing lens 74 is incident on a first dichroic mirror 75. The first dichroic mirror 75 reflects the R light, whereas transmitting the G light and the B light. The optical path of the R light reflected off the first dichroic mirror 75 is folded by the first dichroic mirror 75 and a reflection mirror 76, and the R light is incident on a field lens for R light 77R. The field lens for R light 77R parallelizes the R light reflected off the reflection mirror 76 and directs the R light to a spatial light modulator for R light 14R.

The spatial light modulator for R light 14R modulates the R light in accordance with an image signal. The R light modulated by the spatial light modulator for R light 14R is incident on a cross dichroic prism 80, which is a light combining system.

The G light and the B light having passed through the first dichroic mirror 75 are incident on a second dichroic mirror 81. The second dichroic mirror 81 reflects the G light, whereas transmitting the B light. The optical path of the G light reflected off the second dichroic mirror 81 is folded by the second dichroic mirror 81, and the G light is incident on a field lens for G light 77G. The field lens for G light 77G parallelizes the G light reflected off the second dichroic mirror 81 and directs the G light to a spatial light modulator for G light 14G. The spatial light modulator for G light 14G modulates the G light in accordance with the image signal. The G light modulated by the spatial light modulator for G light 14G is incident on a surface of the cross dichroic prism 80 that differs from the surface on which the R light is incident.

The B light having passed through the second dichroic mirror 81 passes through a relay lens 82, and the optical path of the B light is folded when the B light is reflected off a reflection mirror 83. The B light reflected off the reflection mirror 83 passes through a relay lens 84, and the optical path of the B light is folded when the B light is reflected off a reflection mirror 85. The B light is then incident on a field lens for B light 77B. Since the optical path of the B light is longer than those of the R light and the G light, the relay system formed of the relay lenses 82 and 84 is provided in the optical path of the B light in order to make the illumination magnifications in the spatial light modulators equal for all the color light beams.

The field lens for B light 77B parallelizes the B light reflected off the reflection mirror 85 and directs the B light to a spatial light modulator for B light 14B. The spatial light modulator for B light 14B modulates the B light in accordance with the image signal. The B light modulated by the spatial light modulator for B light 14B is incident on a surface of the cross dichroic prism 80 that differs from the surfaces on which the R light and the G light are incident.

The cross dichroic prism 80 has two dichroic layers 86 and 87 disposed in such away that they intersect each other at substantially right angles. The first dichroic layer 86 reflects the R light, whereas transmitting the G light and the B light. The second dichroic layer 87 reflects the B light, whereas transmitting the R light and the G light. The cross dichroic prism 80 combines the R light, the G light, and the B light, which are incident from the directions different from one another, and outputs the combined light toward the projection system 50. The image light having exited from the cross dichroic prism 80 is projected after passing through the refraction optical unit 20 and other components in the projection system 50.

The housing 2 and the dust-proof cover 4 will next be described. The housing 2 houses the projection system 50 and the image formation optical unit 60. The housing 2 has an opening 2a in a top portion 2b, and the opening 2a allows the projection light projected from the projection system 50 to exit outward.

The dust-proof cover 4 is provided in the housing 2 to block the opening 2a. The projection unit 6 in the housing is protected from dust and dirt by blocking the opening 2a with the dust-proof cover 4. Blocking the opening 2a further not only prevents, for example, foreign matter from entering the housing but also prevents the projection unit 6 from being destroyed or scratched. The dust-proof cover 4 is made of a light-transmissive material, for example, glass and plastics. Since the dust-proof cover 4 is made of a light-transmissive material, the projection light projected from the projection unit 6 can reach the screen 10 through the dust-proof cover 4. Further, the dust-proof cover 4 has a substantially uniform thickness.

Figure 6:
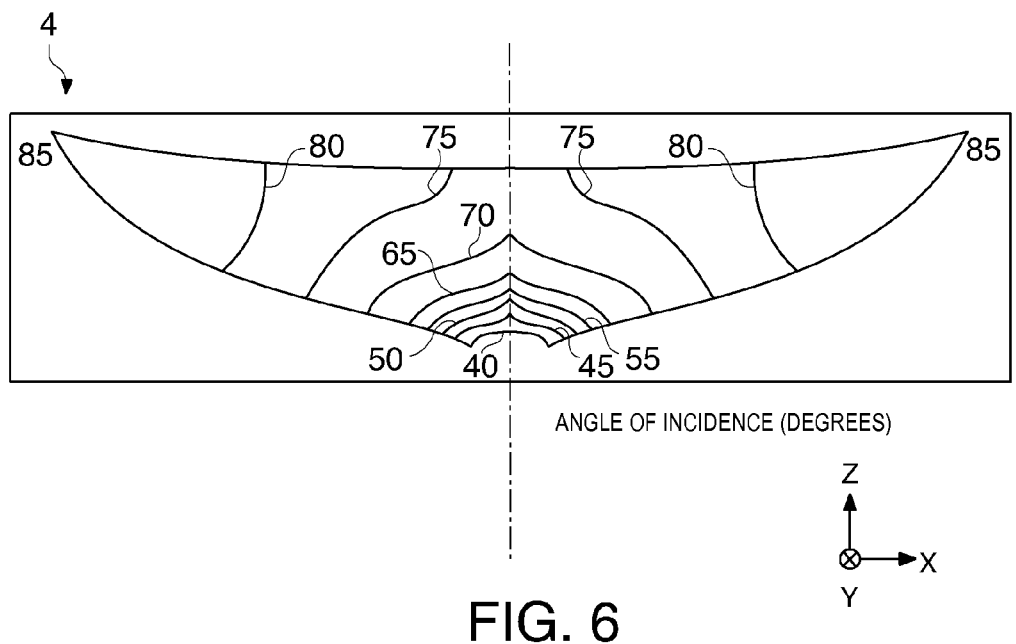
FIG. 6 is a plan view of a dust-proof cover in the first embodiment.

FIG. 6 is a plan view of the dust-proof cover 4. The dust-proof cover 4 has a substantially rectangular shape in the plan view. FIG. 6 shows contour lines indicating the actual angle of incidence of the projection light that impinges on the light-incident surface of the dust-proof cover 4. The angle of incidence of the projection light that impinges on the light-incident surface of the dust-proof cover 4 ranges widely from approximately 25 degrees to approximately 85 degrees. The contour lines corresponding to 40 degrees and smaller are omitted because the spacings therebetween are narrow. The angle of incidence used herein is the angle between a normal to the light-incident surface in the position where a projection light ray of interest is incident and the projection light ray.

Part of the light incident on the dust-proof cover 4 is reflected off the light-incident surface thereof and disadvantageously lost. The ratio of the amount of light reflected off the dust-proof cover 4 to the total amount of light incident thereon, that is, the reflectance, is determined by the angle of incidence of the projection light.

Figure 7:
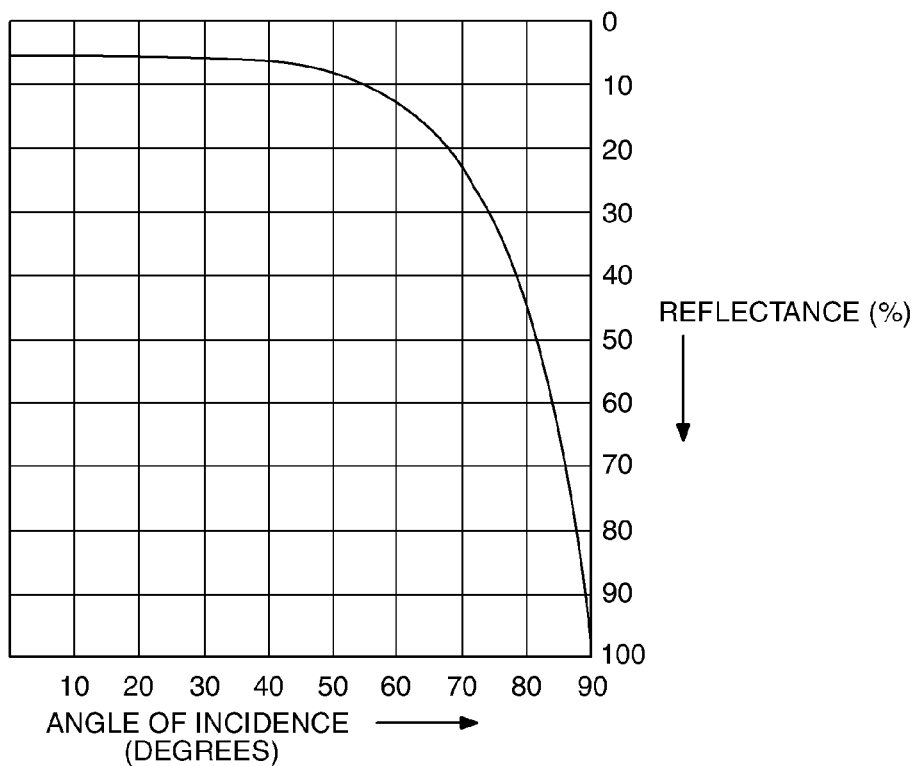
FIG. 7 shows the relationship between the reflectance and the angle of incidence of projection light incident on the dust-proof cover in the first embodiment.

FIG. 7 shows the relationship between the reflectance and the angle of incidence of the projection light at a predetermined point on a flat glass member that can be used to form the dust-proof cover 4. As shown in FIG. 7, the reflectance increases as the angle of incidence increases. The reflectance increases by approximately 20% when the angle of incidence increases from 0 to 70 degrees, and increases by another 20% when the angle of incidence increases from 70 to 80 degrees. That is, when the angle of incidence changes from 0 to 70 degrees, the amount of projection light that reaches the screen decreases by approximately 20%, and when the angle of incidence changes from 70 to 80 degrees, the amount of projection light that reaches the screen decreases by another 20%.

Figure 8:
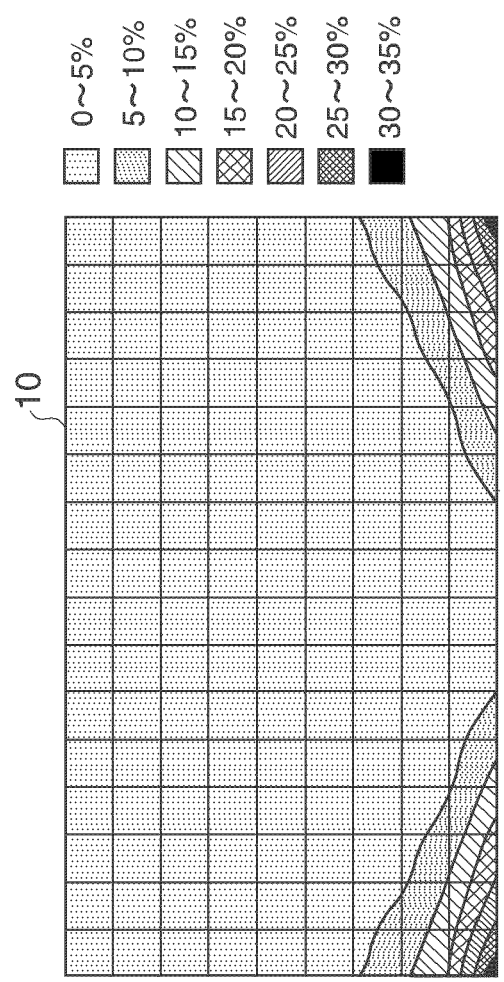
FIG. 8 shows the reflectance of the dust-proof cover in the first embodiment when a single anti-reflection film is formed on the entire light-incident surface of the dust-proof cover and the projector using the dust-proof cover displays an image.

FIG. 8 shows the reflectance at which the light to be projected on the screen projection surface 10a is reflected off the dust-proof cover 4 when a single anti-reflection film is formed on the entire light-incident surface of the dust-proof cover and the projector using the dust-proof cover displays an image. In general, when the amount of light decreases 10% or more, the viewer senses decrease in brightness. As shown in FIG. 8, using the dust-proof cover having a single anti-reflection film formed on the entire light-incident surface leads to decrease in the amount of light by at least 10% in lower right and left portions of the screen projection surface 10a, and the viewer senses that the brightness decreases in these portions.

Figure 9:
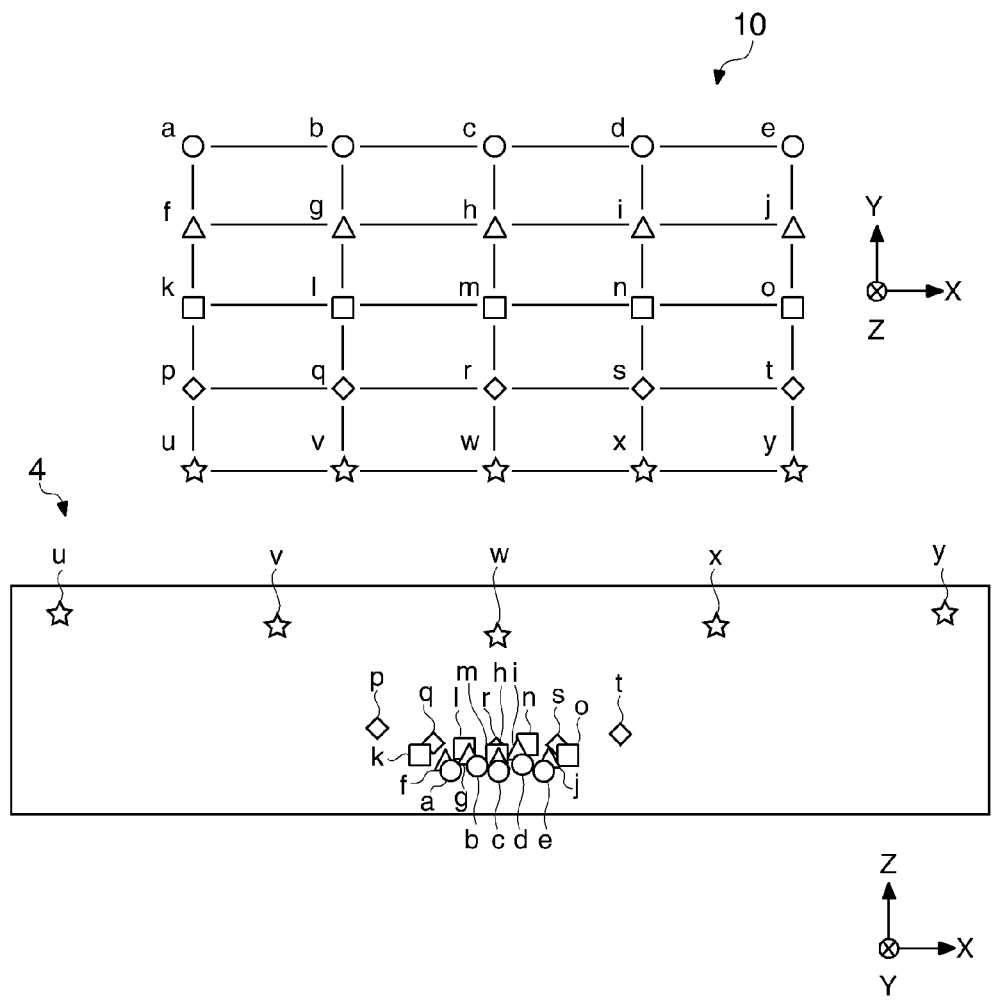
FIG. 9 shows the relationship between the positions on the dust-proof cover where projection light rays are incident and the positions on a screen where the projection light rays are projected in the first embodiment.

FIG. 9 shows the relationship between the positions on the dust-proof cover 4 where projection light rays are incident and the positions on the screen 10 where the projection light rays are projected. As shown in FIG. 9, almost all the projection light rays to be projected on the screen 10 are incident on a central portion of the dust-proof cover 4. On the other hand, projection light rays to be projected in a lower portion of the screen (points u to y) are incident on a peripheral portion of the dust-proof cover 4.

Figure 10:
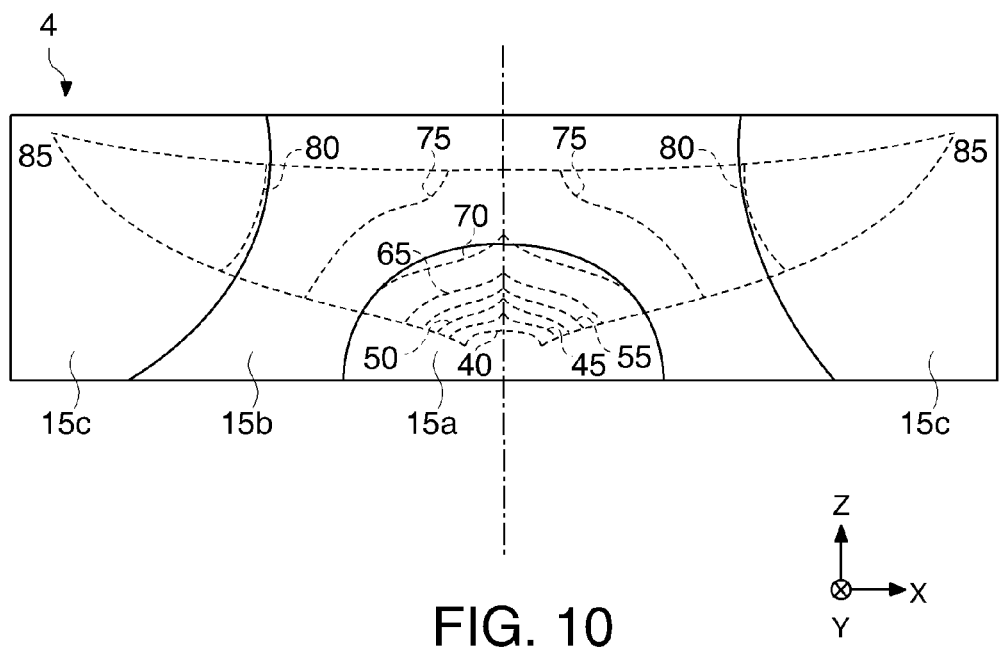
FIG. 10 is a plan view for describing a plurality of areas set on the light-incident surface of the dust-proof cover in the first embodiment.

FIG. 10 is a plan view for describing a plurality of areas set in the dust-proof cover 4. A plurality of areas is set in the dust-proof cover 4 relative to the projection unit 6. In other words, the plurality of areas is set based on which portion of the projection light from the projection unit 6 is incident or how the projection light from the projection unit 6 is incident. Specifically, a first area (reference area) 15a including an area where the projection light is incident at an angle of incidence ranging from 25 to 70 degrees is set on the light-incident surface of the dust-proof cover 4. A second area 15b including an area where the projection light is incident at an angle of incidence ranging from 70 to 80 degrees is set outside the first area 15a. Further, third areas 15c including areas where the projection light is incident at an angle of incidence equal to or greater than 80 degrees are set outside the second area 15b.

The first area 15a is provided with an anti-reflection film (AR coating) showing an anti-reflection effect on the projection light incident at an angle of incidence ranging from 25 to 70 degrees. The second area 15b is provided with an anti-reflection film showing an anti-reflection effect on the projection light incident at an angle of incidence ranging from 70 to 80 degrees. Each of the third areas 15c is provided with an anti-reflection film showing an anti-reflection effect on the projection light incident at an angle of incidence equal to or greater than 80 degrees. That is, a process of preventing the reflection of the projection light incident at a larger angle of incidence is performed on an area spaced further apart from the first area 15a.

Figure 11:
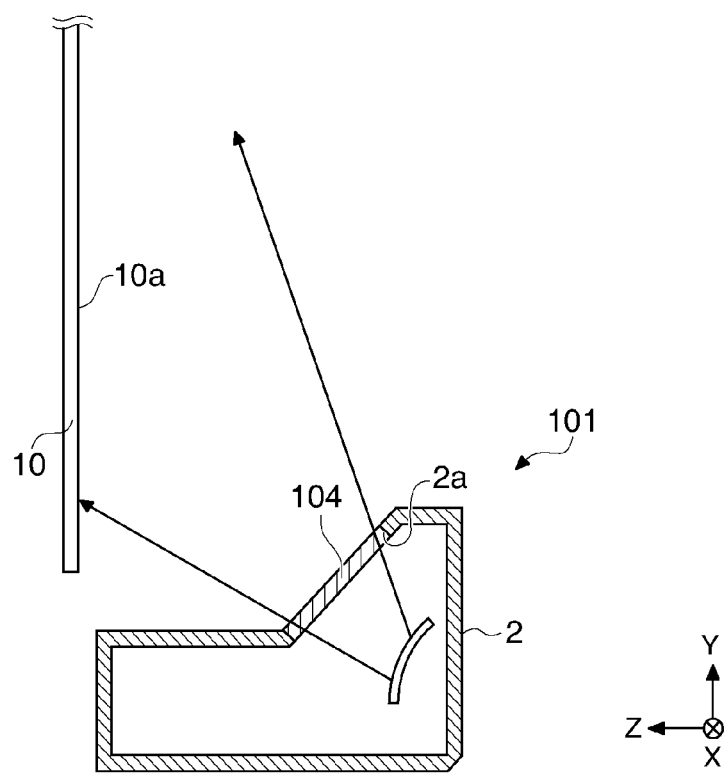
FIG. 11 is a transverse cross-sectional view of a projector of related art.

FIG. 11 is a transverse cross-sectional view of a projector 101 of related art. The projector 101 of related art is a proximity projection-type projector, like the projector 1 of the first embodiment. In a proximity projection-type projector, the projection light is inclined toward the screen 10 in the YZ plane in order to project the light toward the screen 10. In the projector 101 of related art, to prevent the angle of incidence of the light incident on a dust-proof cover 104 from increasing due to the inclined projection light, the dust-proof cover 104 is provided in such a way that the light-exiting surface thereof is inclined and oriented toward the screen 10. As shown in FIG. 3, however, the projection light from the projector is incident at a variety of angles of incidence also in the XY plane. Therefore, inclining the dust-proof cover 104 to compensate the change in the angle of incidence only in the YZ plane cannot effectively reduce the loss due to the reflection.

In the first embodiment, since a plurality of areas is set on the light-incident surface of the dust-proof cover 4 and each of the areas is provided with an anti-reflection film having an anti-reflection effect according to the actual angle of incidence of the projection light, the loss due to the reflection off the light-incident surface and hence decrease in image brightness can be reduced. Further, the cost can be reduced as compared to a case where a multilayer coating film is formed on the entire light-incident surface of the dust-proof cover 4 to achieve an anti-reflection capability across a wide range of angle of incidence. In the first embodiment, the areas are separated in terms of the angle of incidence in such a way that a new area is set when the reflectance increases by approximately 20%, as shown in FIG. 7. The areas are not necessarily set in the way described above, but the size of each of the areas may be smaller. An example of the anti-reflection film for preventing the reflection off the light-incident surface may be a dielectric multilayer coating. As another example of the anti-reflection process, a sub-wavelength structure or any other minute structure may be provided on the light-incident surface to prevent the reflection off the light-incident surface. That is, the anti-reflection process is not limited to the use of an anti-reflection film but may be any process that achieves an angle-dependent, anti-reflection effect across the range of angle of incidence of the projection light incident on each of the divided areas.

The dust-proof cover 4, which has a uniform thickness thereacross, can be a member having no optical power. When the dust-proof cover 4 has no optical power, a slight positional error in a process of attaching the dust-proof cover 4 does not greatly affect the image quality. This allows the projector 1 to be assembled at a lower cost and further allows the dust-proof cover 4 to be readily exchanged, whereby ease of maintenance can be improved.

While the first embodiment has been described with reference to a front projection-type projector, the projector in the first embodiment may of course be a rear projection-type projector. The first embodiment may also be applied to a scanning projector that scans a laser beam on a screen to display an image. For example, when the screen has a huge size or an image is projected from the projector located close to the screen, the laser beam is scanned over a large angle, and the laser beam is incident on the dust-proof cover at large angles of incidence. In this case, using the dust-proof cover described in the first embodiment can prevent decrease in image brightness. Further, while the first embodiment has been described with reference to a projector using a dust-proof cover having undergone an anti-reflection process, the dust-proof cover may be used with a camera including a wide-angle lens to prevent light reflection, and the same advantageous effect on a captured image can be provided as in the first embodiment. An example of the camera including a wide-angle lens may be a security camera.

Figure 12:
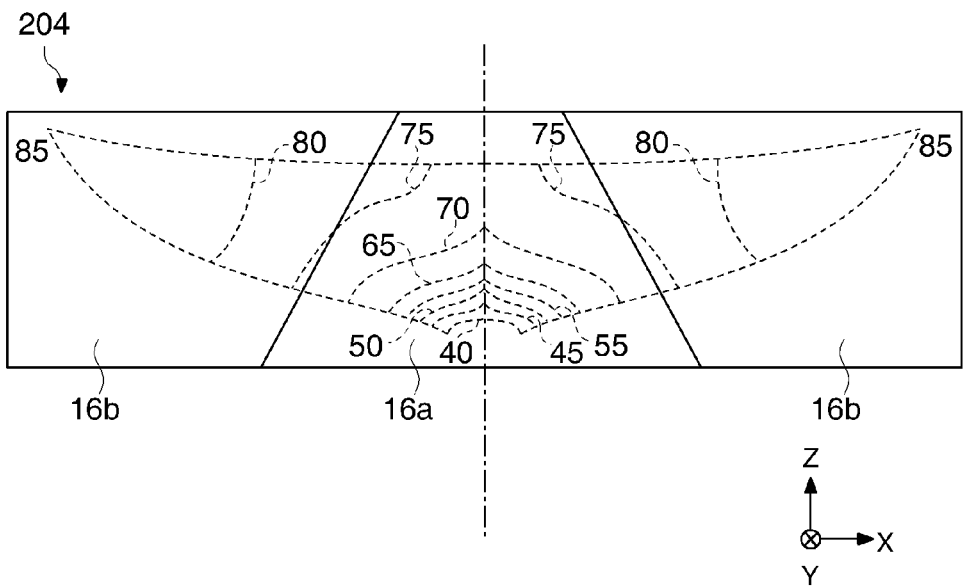
FIG. 12 is a plan view for describing a plurality of areas set in a dust-proof cover according to a first variation of the first embodiment.

FIG. 12 is a plan view for describing how to set areas of a dust-proof cover 204 according to a first variation of the first embodiment. In the first variation, the light-incident surface of the dust-proof cover 204 is divided into three areas in the longitudinal direction. Among the three areas, the central area in the longitudinal direction is set as a first area (reference area) 16a including an area where the projection light is incident at an angle of incidence ranging from 25 to 75 degrees. The areas on both sides of the first area 16a are set as second areas 16b, each of which including an area where the projection light is incident at an angle of incidence equal to or greater than 75 degrees.

The first area 16a is provided with an anti-reflection film having an anti-reflection effect on the projection light incident at an angle of incidence ranging from 25 to 75 degrees. Each of the second areas 16b is provided with an anti-reflection film having an anti-reflection effect on the projection light incident at an angle of incidence equal to or greater than 75 degrees. That is, a process of preventing the reflection of the projection light incident at a larger angle of incidence is performed on an area spaced further apart from the first area 16a.

As shown in FIG. 8, the light projected on lower right and left portions suffers from significant reduction in the amount of light projected on the screen 10. As shown in FIG. 9, the light projected on the lower right and left portions (points u, v, x, and y) of the screen 10 is incident on the areas set as the second areas 16b of the dust-proof cover 204, whereas most of the light projected on the remaining portion of the screen 10 (the light that does not suffer from significant reduction in the amount of light) is incident on the area set as the first area 16a of the dust-proof cover 204.

Setting small areas, like the dust-proof cover 4 described in the first embodiment, allows the amount of projection light that reaches the screen 10 to be increased. Even when the light-incident surface of the dust-proof cover 204 is divided into three areas in the longitudinal direction in the first variation, the viewer will still not sense that the amount of light decreases. As compared to the case where smaller areas are set, the anti-reflection film and other components are readily processed and formed, whereby the cost can be reduced.

Figure 13:
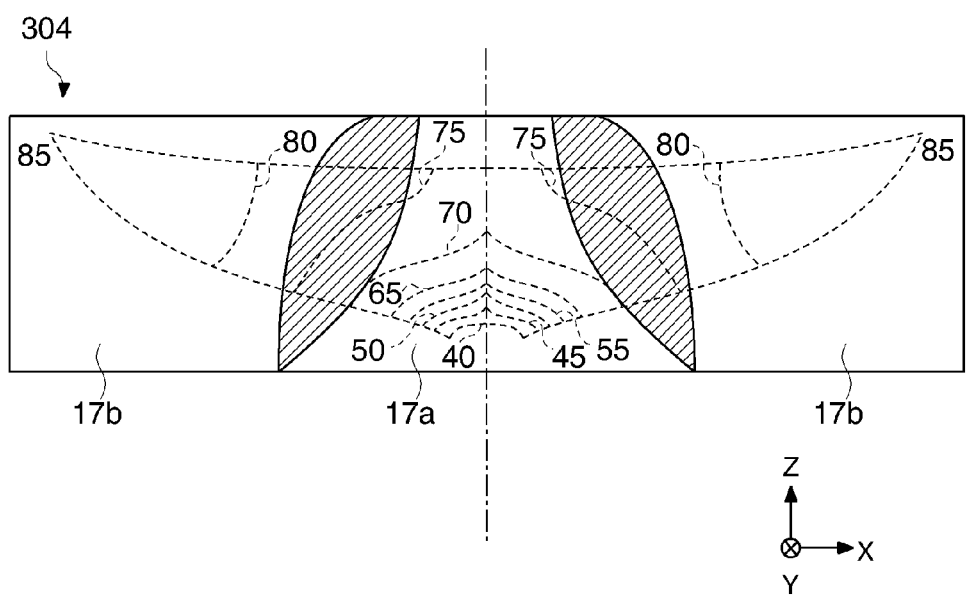
FIG. 13 is a plan view for describing a plurality of areas set in a dust-proof cover according to a second variation of the first embodiment.

FIG. 13 is a plan view for describing how to set areas of a dust-proof cover 304 according to a second variation of the first embodiment. In the second variation, the light-incident surface of the dust-proof cover 304 is divided into three areas in the longitudinal direction, and the areas overlap with each other. Among the three areas, the central area in the longitudinal direction is set as a first area (reference area) 17a including an area where the projection light is incident at an angle of incidence ranging from 25 to 75 degrees. The areas on both sides of the first area 17a are set as second areas 17b, each of which including an area where the projection light is incident at an angle of incidence equal to or greater than 75 degrees.

The first area 17a is provided with an anti-reflection film having an anti-reflection effect on the projection light incident at an angle of incidence ranging from 25 to 75 degrees. Each of the second areas 17b is provided with an anti-reflection film having an anti-reflection effect on the projection light incident at an angle of incidence equal to or greater than 75 degrees. That is, a process of preventing the reflection of the projection light incident at a larger angle of incidence is performed on an area spaced further apart from the first area 17a.

The first area 17a and each of the second areas 17b, that is, the adjacent areas, overlap with each other (the hatched portions in FIG. 13). The overlaps are provided with the anti-reflection film. Forming the overlaps allows the brightness of an image displayed on the screen 10 to change smoothly and hence prevents the viewer from recognizing the boundary between the areas that overlap with each other.

Figure 14:
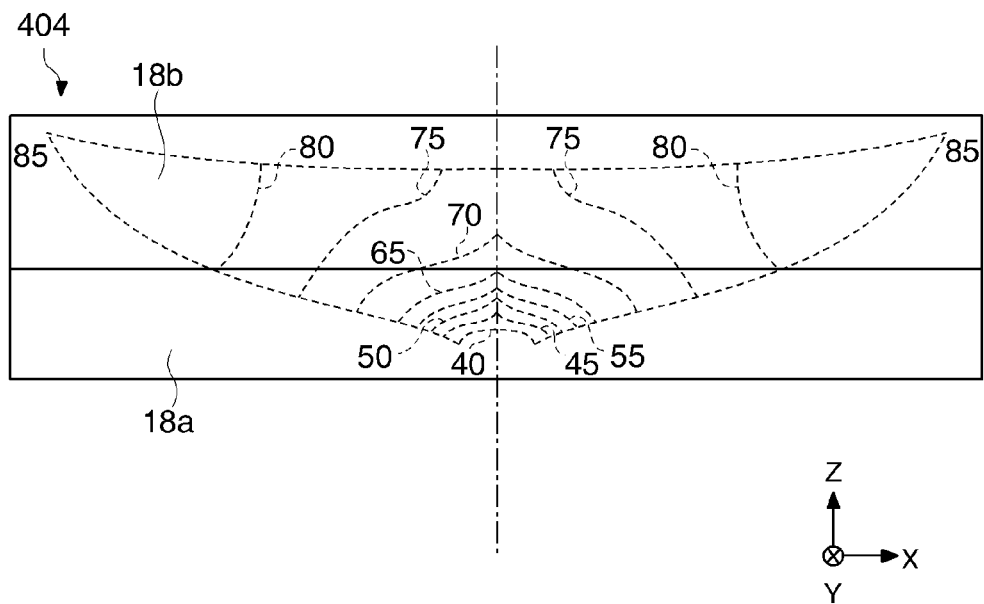
FIG. 14 is a plan view for describing a plurality of areas set in a dust-proof cover according to a third variation of the first embodiment.

FIG. 14 is a plan view for describing how to set areas of a dust-proof cover 404 according to a third variation of the first embodiment. In the third variation, the light-incident surface of the dust-proof cover 404 is divided into two areas in the short-side direction. One of the two areas is set as a first area (reference area) 18a including an area where the projection light is incident at an angle of incidence ranging from 25 to 65 degrees. The area other than the first area 18a is set as a second area 18b including an area where the projection light is incident at an angle of incidence equal to or greater than 70 degrees.

As shown in FIG. 8, the light projected on lower right and left portions suffers from significant reduction in the amount of light projected on the screen 10. As shown in FIG. 9, the light projected on the lower right and left portions (points u, v, x, and y) of the screen 10 is incident on the area set as the second area 18b of the dust-proof cover 404, whereas most of the light projected on the remaining portion of the screen 10 (the light that does not suffer from significant reduction in the amount of light) is incident on the area set as the first area 18a of the dust-proof cover 404.

Setting small areas, like the dust-proof cover 4 described in the first embodiment, allows the amount of projection light that reaches the screen 10 to be increased. Even when the light-incident surface of the dust-proof cover 404 is divided into two areas in the short-side direction in the third variation, the viewer will still not sense that the amount of light decreases. As compared to the case where smaller areas are set, the anti-reflection film and other components are readily processed and formed, whereby the cost can be reduced.

To form wide-angle projection light, the curved mirror 31 is not necessarily used. For example, a shift optical system may be used to form wide-angle projection light.

Second Embodiment

Figure 15:
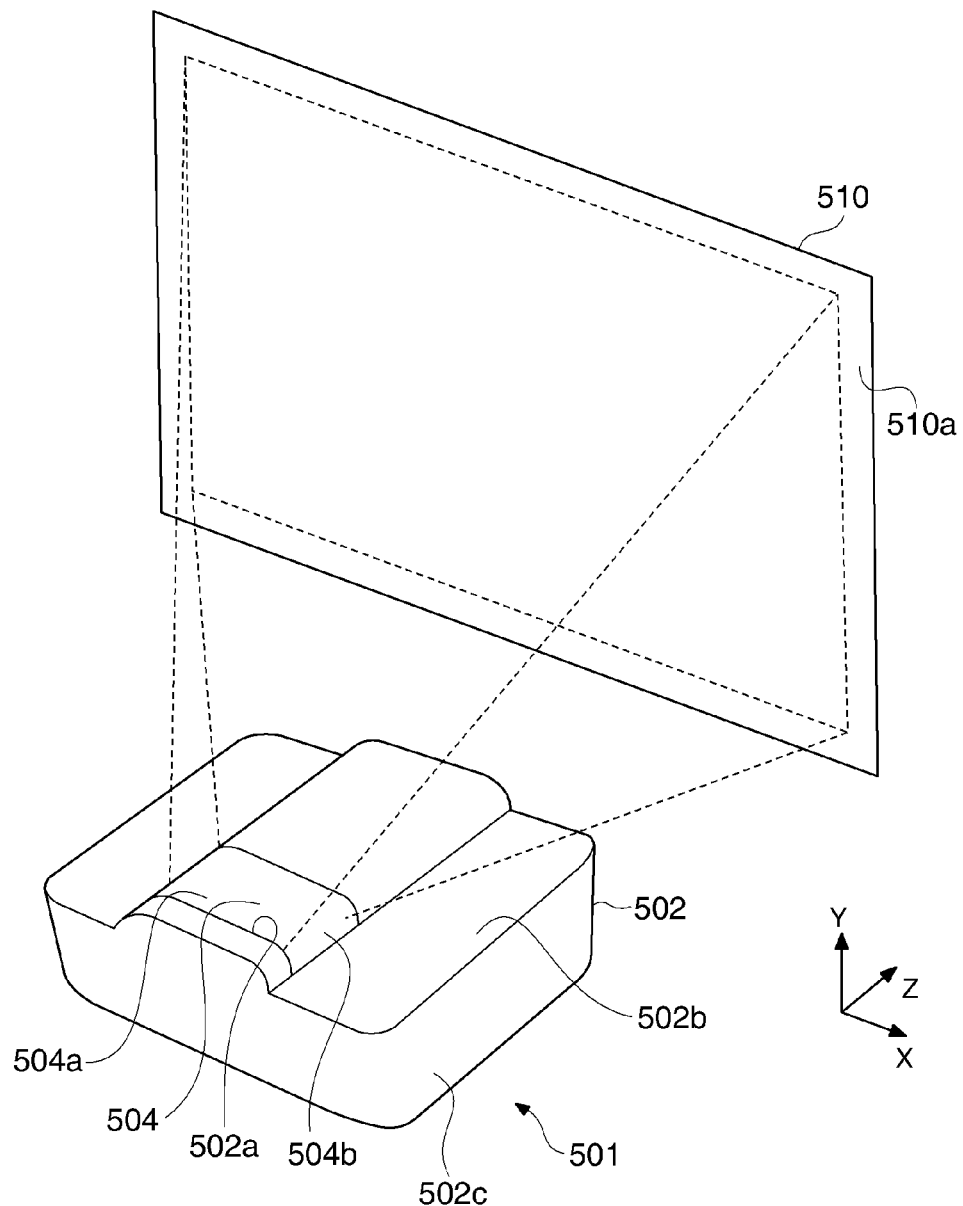
FIG. 15 is a perspective view showing how a projector according to a second embodiment is used.
Figure 16:
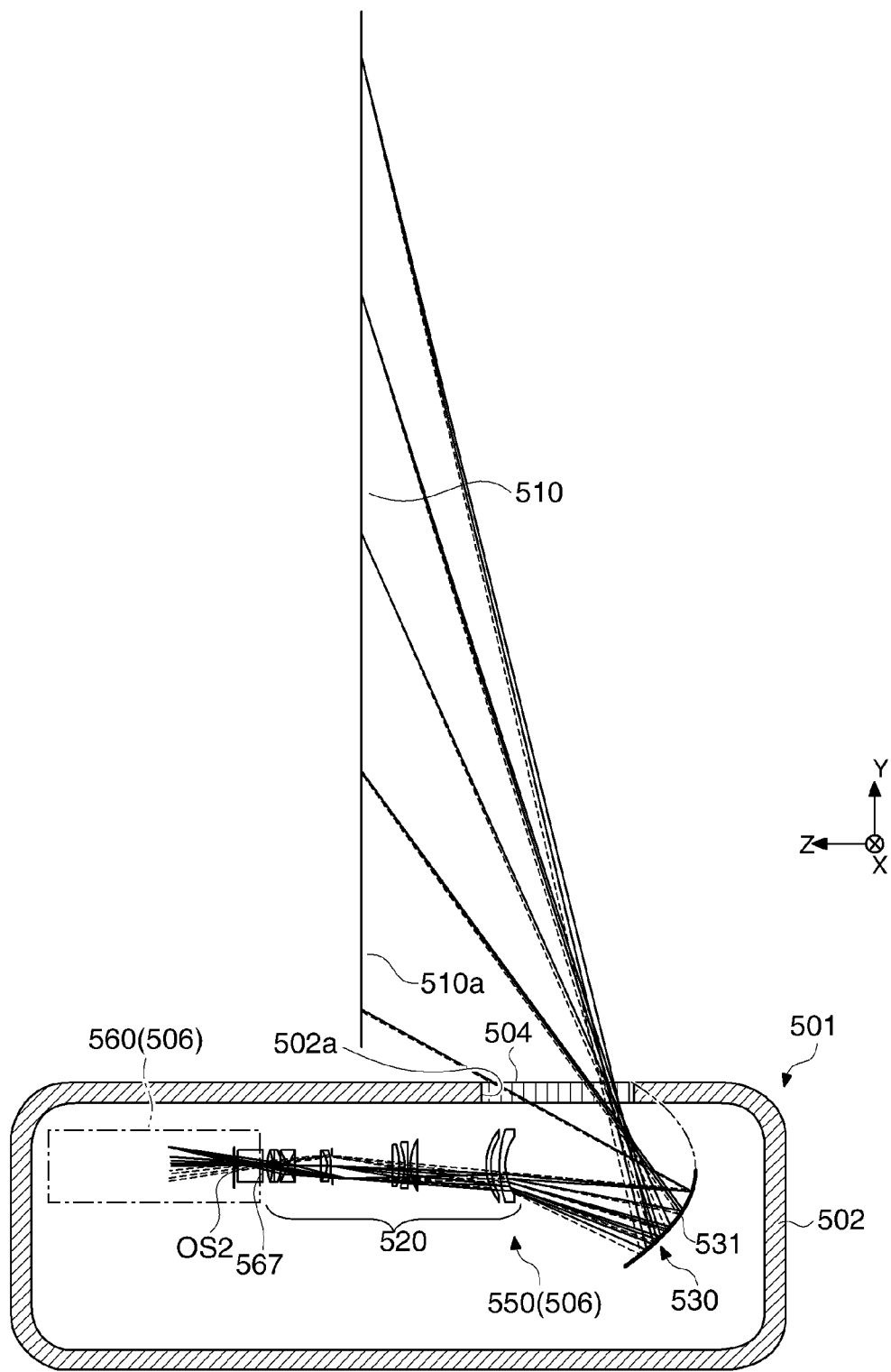
FIG. 16 is a transverse cross-sectional view showing a schematic configuration of the interior of the projector in the second embodiment.

FIG. 15 is a perspective view showing how a projector according to a second embodiment of the invention is used. FIG. 16 is a transverse cross-sectional view showing a schematic configuration of the interior of the projector. The projector 501 is a front projection-type projector that projects projection light on a screen to display an image. A viewer observes the image displayed on the screen. The projector 501 is a proximity projection-type projector that is positioned in the vicinity of a screen 510 and projects wide-angle projection light on the screen 510 to display an image.

The screen 510 is a reflective projection plate and diffuses and reflects the light incident on a front-side screen projection surface (illuminated surface) 510a to display an image. The axis along a normal to the screen projection surface 510a is called a Z axis. The axes perpendicular to the Z axis and intersecting each other at right angles are called an X axis and a Y axis.

The projector 501 generally includes a housing 502, a dust-proof cover (cover portion) 504, and a projection unit 506. The projection unit 506 is housed in the housing 502. Among the components described above, the projection unit 506 will first be described. The projection unit 506 includes a projection system 550 and an image formation optical unit 560.

The projection system 550 enlarges and projects an image on an object plane OS2 onto the screen projection surface 510a of the screen 510. The projection system 550 includes a refraction optical unit 520 and a reflection optical unit (wide-angle light forming reflector) 530. The refraction optical unit 520 is formed of a plurality of lenses, and the reflection optical unit 530 has at least one concave reflection surface.

Figure 17:
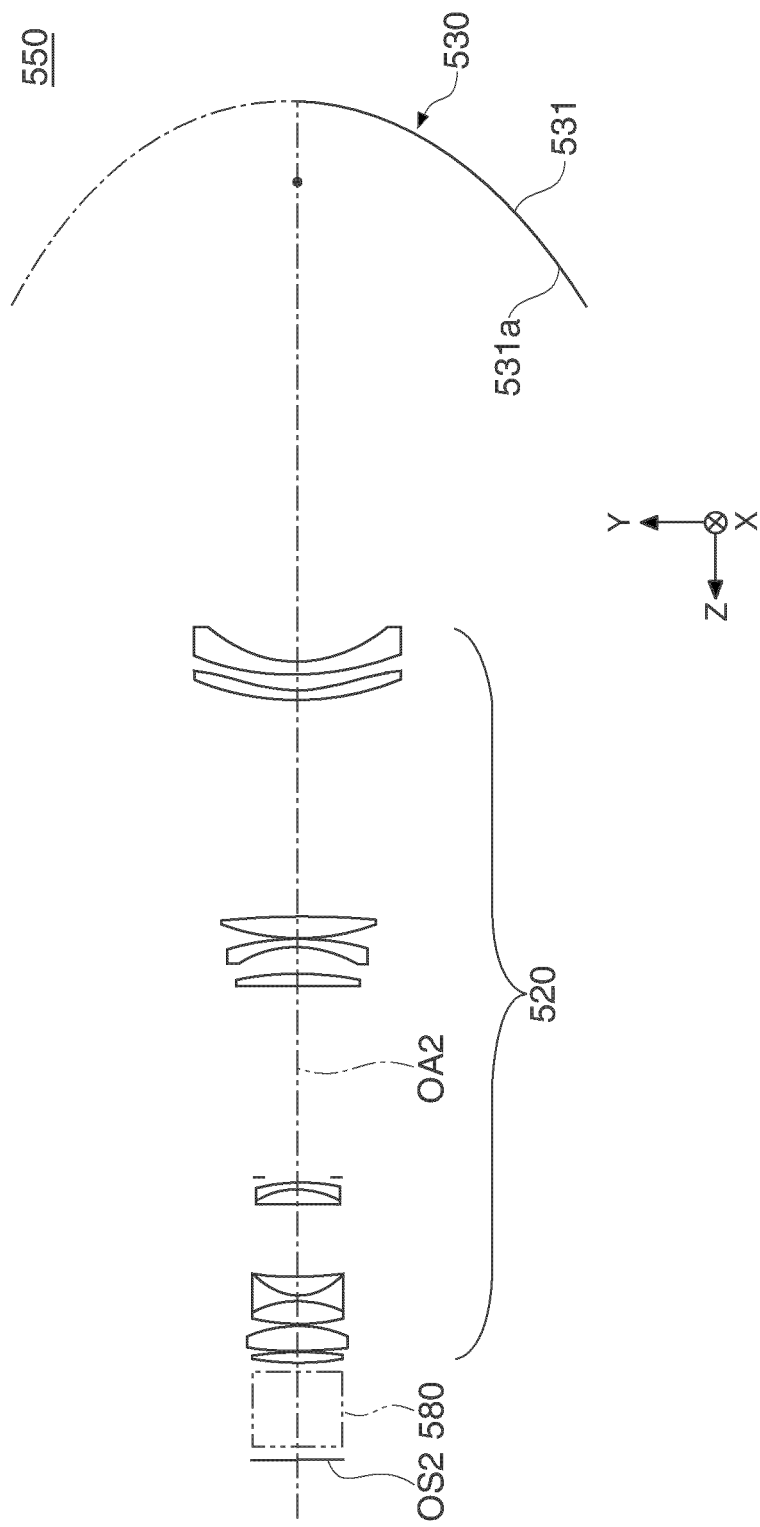
FIG. 17 describes a schematic configuration of a projection system in the second embodiment.

FIG. 17 describes a schematic configuration of the projection system 550. The refraction optical unit 520 is formed of a plurality of refractive lenses disposed below the screen 510 shown in FIG. 16 and along an optical axis OA2 extending in the direction perpendicular to the screen projection surface 510a. The lenses are arranged between the object plane OS2 and the reflection optical unit 530. Each of the lenses has rotational symmetry about the optical axis OA2. Alternatively, all or part of the lenses may have rotational asymmetry. The arrangement of the lenses is adjusted in such a way that projection onto the screen 510 can be optimized in consideration of the shapes and arrangements of the reflection optical unit 530 and other components. The optical axis OA2 does not necessarily extend in the direction perpendicular to the screen projection surface 510a. Further, all or part of the lenses may not share a single optical axis.

Each object point on the object plane OS2 emits a light flux that uniformly diverges from the principal ray, which is perpendicular to the object plane OS2 and parallel to the optical axis OA2. Each of the light fluxes emitted from the object plane OS2 passes through the refraction optical unit 520, is reflected off the reflection optical unit 530 provided below the optical axis OA2 and converted into radial projection light, and is projected on the screen 510.

The reflection optical unit 530 is formed of a single curved mirror 531. The curved mirror 531 is a concave reflection mirror formed of a surface rotationally symmetric about the optical axis OA2. The curved mirror 531 has an aspheric reflective optical surface 531a below the optical axis OA2, that is, on the opposite side of the optical axis OA2 with respect to the screen 510, and reflects the light fluxes having passed through the refraction optical unit 520 toward the screen projection surface 510a of the screen 510. The light fluxes having passed through the refraction optical unit 520 are reflected off the curved mirror 531, which is a concave reflection mirror, and first converge but then diverge. That is, the curved mirror 531 serves to form wide-angle projection light. While the projection system 550 is formed of the refraction optical unit 520 and the reflection optical unit 530 in the above description, the projection system 550 may alternatively be formed only of a refraction optical unit or a reflection optical unit having a power.

Figure 18:
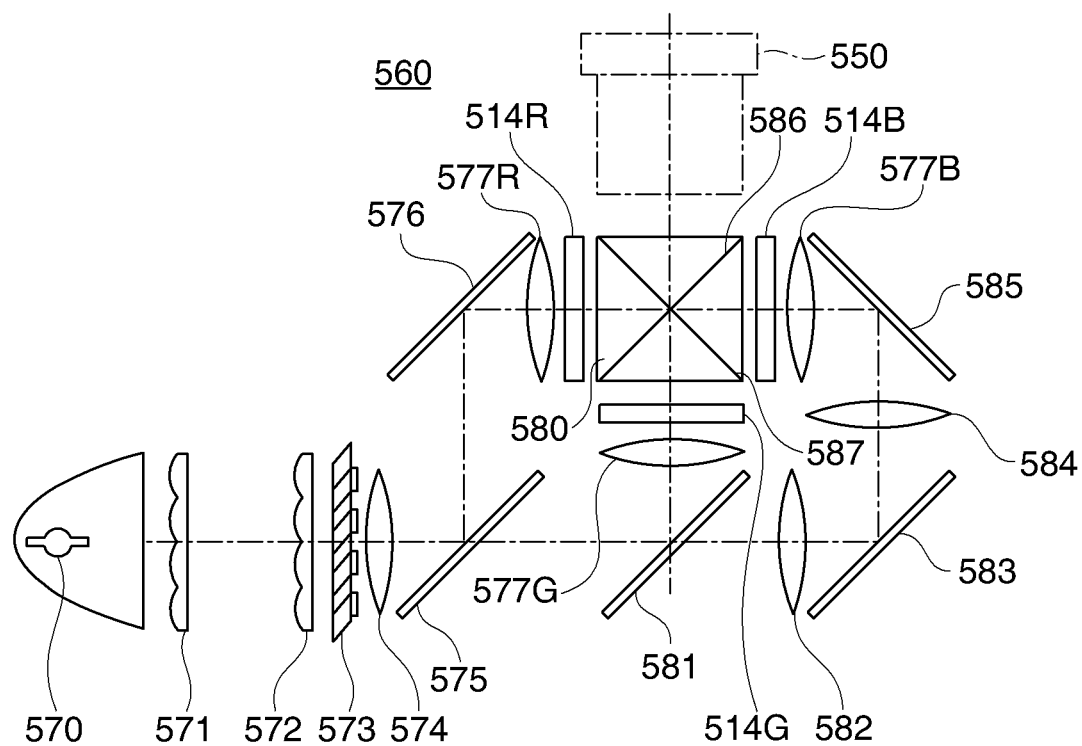
FIG. 18 shows a schematic configuration of an image formation optical unit in the second embodiment.

The image formation optical unit 560 will next be described. FIG. 18 shows a schematic configuration of the image formation optical unit 560. An arc tube 570 is a light source that emits light containing red (R) light, green (G) light, and blue (B) light. The arc tube 70 is, for example, an ultrahigh-pressure mercury lamp.

A first integrator lens 571 and a second integrator lens 572 are arrays of a plurality of lens elements. The first integrator lens 571 divides the light flux from the arc tube 570 into a plurality of sub-light fluxes. Each of the lens elements in the first integrator lens 571 focuses the light flux from the arc tube 570 in the vicinity of the corresponding lens element in the second integrator lens 572. Each of the lens elements in the second integrator lens 572 forms the image of the corresponding lens element in the first integrator lens 571 on spatial light modulators.

The light having passed through the two integrator lenses 571 and 572 is converted by a polarization conversion element 573 into light linearly polarized in a specific oscillation direction. A superimposing lens 574 superimposes the images of the lens elements in the first integrator lens 571 on the spatial light modulators. The first integrator lens 571, the second integrator lens 572, and the superimposing lens 574 make the intensity distribution of the light from the arc tube 570 uniform on the spatial light modulators. The light having passed through the superimposing lens 574 is incident on a first dichroic mirror 575. The first dichroic mirror 575 reflects the R light, whereas transmitting the G light and the B light. The optical path of the R light reflected off the first dichroic mirror 575 is folded by the first dichroic mirror 575 and a reflection mirror 576, and the R light is incident on a field lens for R light 577R. The field lens for R light 577R parallelizes the R light reflected off the reflection mirror 576 and directs the R light to a spatial light modulator for R light 514R.

The spatial light modulator for R light 514R modulates the R light in accordance with an image signal. The R light modulated by the spatial light modulator for R light 514R is incident on a cross dichroic prism 580, which is a light combining system.

The G light and the B light having passed through the first dichroic mirror 575 are incident on a second dichroic mirror 581. The second dichroic mirror 581 reflects the G light, whereas transmitting the B light. The optical path of the G light reflected off the second dichroic mirror 581 is folded by the second dichroic mirror 581, and the G light is incident on a field lens for G light 577G. The field lens for G light 577G parallelizes the G light reflected off the second dichroic mirror 581 and directs the G light to a spatial light modulator for G light 514G. The spatial light modulator for G light 514G modulates the G light in accordance with the image signal. The G light modulated by the spatial light modulator for G light 514G is incident on a surface of the cross dichroic prism 580 that differs from the surface on which the R light is incident.

The B light having passed through the second dichroic mirror 581 passes through a relay lens 582, and the optical path of the B light is folded when the B light is reflected off a reflection mirror 583. The B light reflected off the reflection mirror 583 passes through a relay lens 584, and the optical path of the B light is folded when the B light is reflected off a reflection mirror 585. The B light is then incident on a field lens for B light 577B. Since the optical path of the B light is longer than those of the R light and the G light, the relay system formed of the relay lenses 582 and 584 is provided in the optical path of the B light in order to make the illumination magnifications in the spatial light modulators equal for all the color light beams.

The field lens for B light 577B parallelizes the B light reflected off the reflection mirror 585 and directs the B light to a spatial light modulator for B light 514B. The spatial light modulator for B light 514B modulates the B light in accordance with the image signal. The B light modulated by the spatial light modulator for B light 514B is incident on a surface of the cross dichroic prism 580 that differs from the surfaces on which the R light and the G light are incident.

The cross dichroic prism 580 has two dichroic layers 586 and 587 disposed in such a way that they intersect each other at substantially right angles. The first dichroic layer 586 reflects the R light, whereas transmitting the G light and the B light. The second dichroic layer 587 reflects the B light whereas transmitting the R light and the G light. The cross dichroic prism 580 combines the R light, the G light, and the B light, which are incident from the directions different from one another, and outputs the combined light toward the projection system 550. The image light having exited from the cross dichroic prism 580 is projected after passing through the refraction optical unit 520 and other components in the projection system 550.

The housing 502 and the dust-proof cover 504 will next be described. The housing 502 houses the projection system 550 and the image formation optical unit 560. The housing 502 has an opening 502a in a top portion 502b, and the opening 502a allows the projection light projected from the projection system 550 to exit outward.

The dust-proof cover 504 is provided in the housing 502 to block the opening 502a. The projection unit 506 in the housing 502 is protected from dust and dirt by blocking the opening 502a with the dust-proof cover 504. Blocking the opening 502a further not only prevents, for example, foreign matter from entering the housing 502 but also prevents the projection unit 506 from being destroyed or scratched. The dust-proof cover 504 is made of a light-transmissive material, for example, glass and plastics. Since the dust-proof cover 504 is made of a light-transmissive material, the projection light projected from the projection unit 506 can reach the screen 510 through the dust-proof cover 504.

Figure 19:
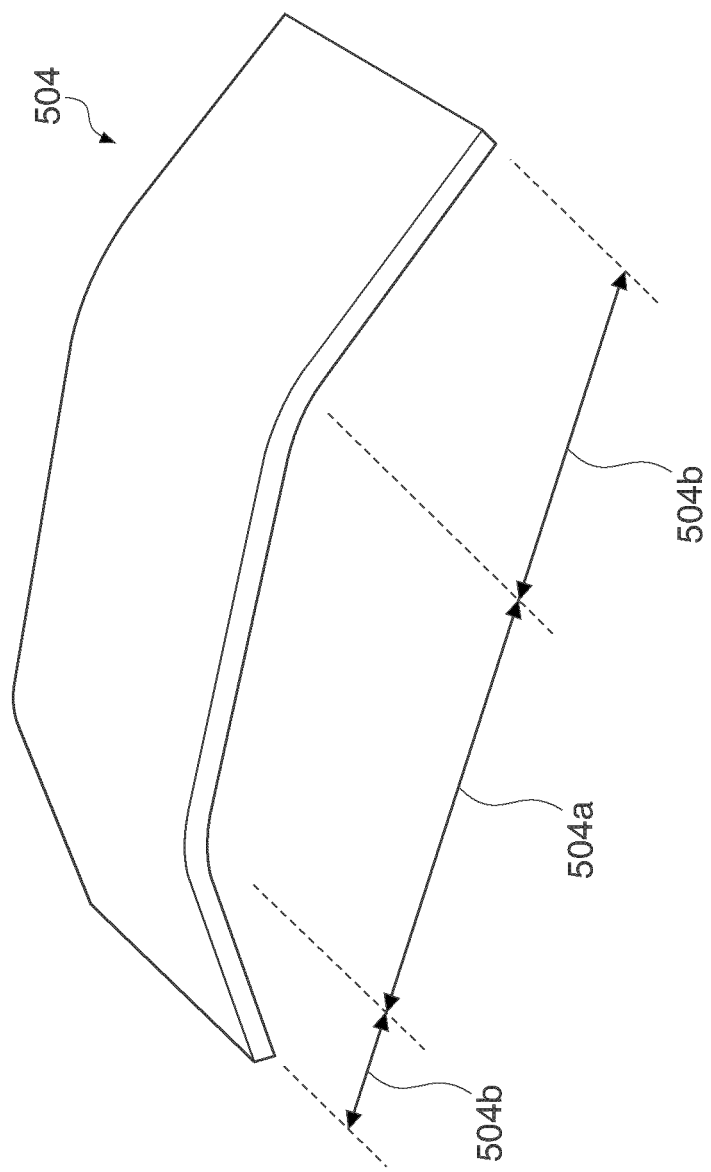
FIG. 19 is an exterior perspective view of a dust-proof cover in the second embodiment.
Figure 20:
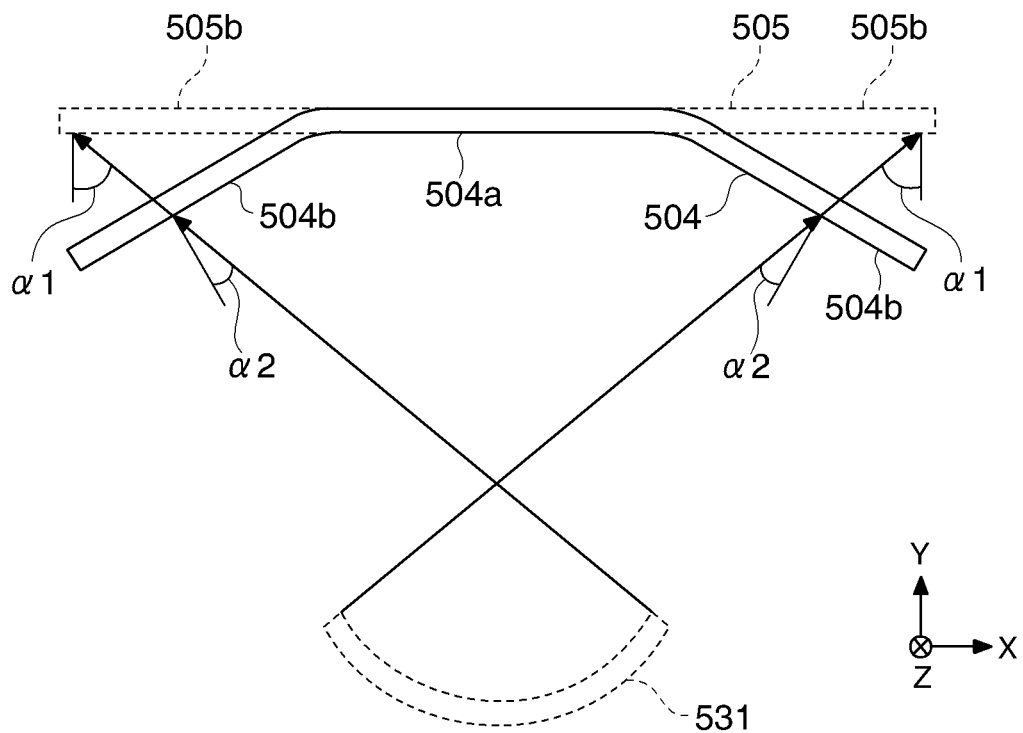
FIG. 20 is a front view of the dust-proof cover in the second embodiment.

FIG. 19 is an exterior perspective view of the dust-proof cover 504. FIG. 20 is a front view of the dust-proof cover 504. As shown in FIGS. 19 and 20, the dust-proof cover 504 has a substantially uniform thickness. The dust-proof cover 504 has a central portion 504a and peripheral portions 504b adjacent to the central portion 504a. That is, the dust-proof cover 504 is formed of two types of areas, the central portion 504a and the peripheral portions 504b. The central portion 504a and the peripheral portions 504b are positioned differently from each other relative to the projection unit 506. In other words, the central portion 504a and the peripheral portions 504b differ from each other in terms of which portion of the projection light from the projection unit 506 is incident or how the projection light from the projection unit 506 is incident. The central light of the projection light is incident on the central portion 504a, and the peripheral light of the projection light is incident on the peripheral portions 504b. Each of the central portion 504a and the peripheral portions 504b is formed of a flat member, and each of the peripheral portions 504b is inclined to the central portion 504a and bent toward the side on which the projection light is incident. As shown in FIG. 20, the central portion 504a has a substantially rectangular shape, and the peripheral portions 504b are connected only to a pair of sides of the central portion 504a that face each other. Therefore, the dust-proof cover 504 can be manufactured only by bending both sides of a glass plate or a plastic plate having an entirely flat structure, whereby the manufacturing cost can be reduced.

Part of the light incident on the dust-proof cover 504 is reflected off the light-incident surface thereof and disadvantageously lost. The ratio of the amount of light reflected off the dust-proof cover 504 to the total amount of light incident thereon, that is, the reflectance, is determined by the angle of incidence of the projection light. The angle of incidence used herein is the angle between a normal to the light-incident surface in the position where a projection light ray of interest is incident and the projection light ray.

Figure 21:
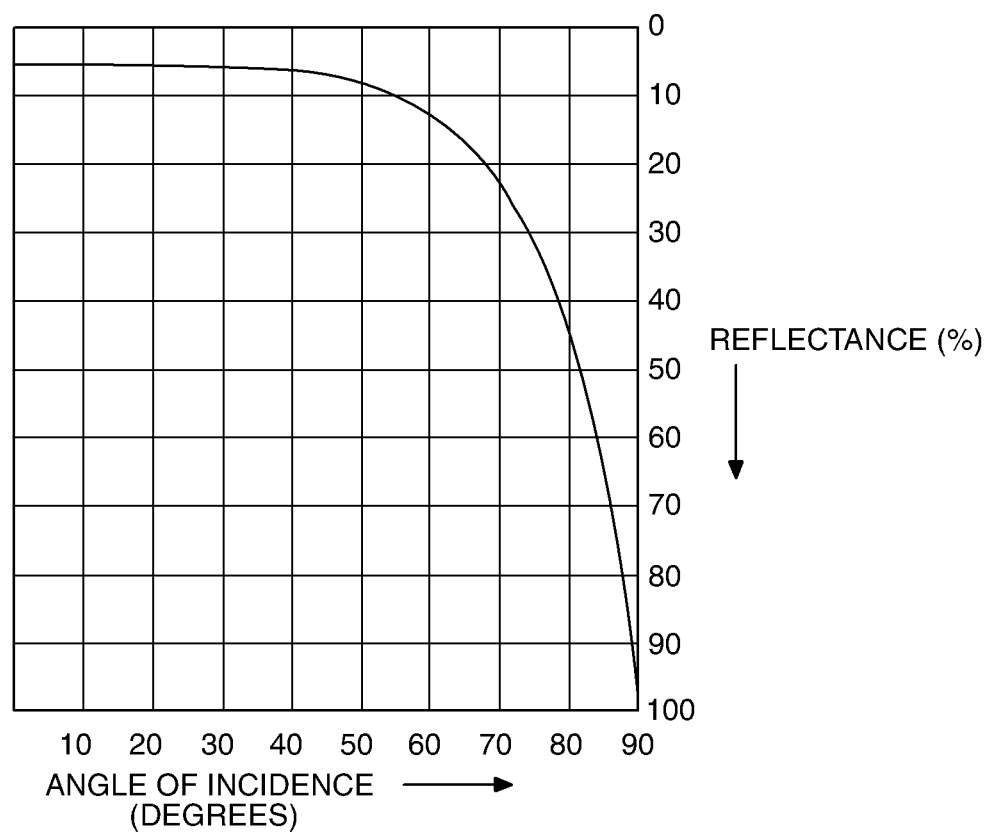
FIG. 21 shows the relationship between the reflectance and the angle of incidence of projection light incident on the dust-proof cover in the second embodiment.

FIG. 21 shows the relationship between the reflectance and the angle of incidence of the projection light at a predetermined point on a flat glass member that can be used to form the dust-proof cover 504. As shown in FIG. 21, the reflectance increases as the angle of incidence increases. In FIG. 20, the dashed line indicates a dust-proof cover 505 having no peripheral bent portions but having an entirely flat single light-incident surface. The dust-proof cover 505 having an entirely flat single light-incident surface shows a large reflectance value in peripheral portions 505b where the angle of incidence $\alpha 1$ increases. That is, the dust-proof cover 505 having an entirely flat single light-incident surface is disadvantageous in that most of the light incident on the peripheral portions 505b is reflected and the image portion formed by the light having passed through the peripheral portions 505b has reduced brightness.

Figure 22:
FIG. 22 shows the reflectance at which light to be projected on a screen projection surface is reflected off a dust-proof cover in the second embodiment when the dust-proof cover has an entirely flat single light-incident surface and the projector using the dust-proof cover displays an image.

FIG. 22 shows the reflectance at which the light to be projected on the screen projection surface 510a is reflected off the dust-proof cover 505 when the dust-proof cover 505 has an entirely flat single light-incident surface and the projector using the dust-proof cover 505 displays an image. In general, when the amount of light decreases 10% or more, the viewer senses decrease in brightness. As clearly shown in FIG. 22, using the dust-proof cover 505 having an entirely flat single light-incident surface leads to decrease in the amount of light by at least 10% in lower right and left portions of the screen projection surface 510a, and the viewer senses that the brightness decreases in these portions.

In contrast, since the dust-proof cover 504 of the second embodiment has the bent peripheral portions 504b, the angle of incidence $\alpha 2$ and hence the reflectance will not greatly increase. Therefore, the dust-proof cover 504 of the second embodiment does not likely cause the viewer to sense decrease in brightness in the image portion formed by the light having passed through the peripheral portions 504b.

The dust-proof cover 504, which has a uniform thickness thereacross, has no optical power. When the dust-proof cover 504 has no optical power, a slight positional error in a process of attaching the dust-proof cover 504 does not greatly affect the image quality. This allows the projector 501 to be assembled at a lower cost and further allows the dust-proof cover 504 to be readily exchanged, whereby ease of maintenance can be improved.

Further, since each of the central portion 504a and the peripheral portions 504b of the dust-proof cover 504 is formed of a flat member, the manufacturing cost can be reduced compared to a case where each of the central portion 504a and the peripheral portions 504b is formed of a curved member.

In the second embodiment, the dust-proof cover 504 is bent so that the reflectance at which the projection light is reflected decreases. An anti-reflection film (AR coating) may be formed on the light-incident surface of the dust-proof cover 504 to further reduce the reflectance.

On the other hand, since the dust-proof cover 504 is bent along the boundaries between the central portion 504a and each of the peripheral portions 504b, the light having passed through the boundaries may be distorted in some cases. To correct the distortion, the spatial light modulators 514R, 514G, and 514B may be used to correct in advance the light passing through the boundaries.

While the second embodiment has been described with reference to a front projection-type projector, the projector in the second embodiment may of course be a rear projection-type projector. The second embodiment may also be applied to a scanning projector that scans a laser beam on a screen to display an image. For example, when the screen has a huge size or an image is projected from the projector located close to the screen, the laser beam is scanned over a large angle. In this case, using the dust-proof cover described in the second embodiment can prevent decrease in image brightness. Further, while the second embodiment has been described with reference to a projector including a bent dust-proof cover, the dust-proof cover may be used with a camera including a wide-angle lens to reduce the angle of incidence of the light incident on the dust-proof cover, and the same advantageous effect on a captured image can be provided as in the second embodiment. An example of the camera including a wide-angle lens may be a security camera.

Figure 23:
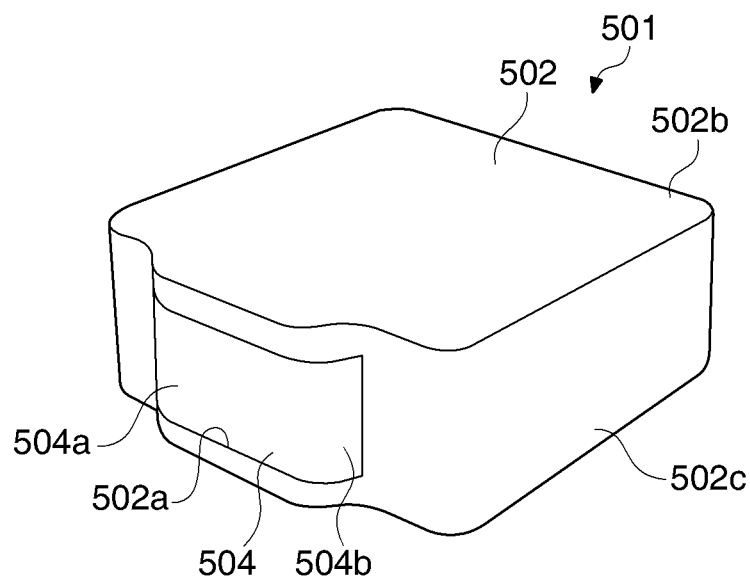
FIG. 23 is an exterior perspective view of a projector according to a first variation of the second embodiment.

FIG. 23 is an exterior perspective view of the projector 501 according to a first variation of the second embodiment. The components that are the same as those described above have the same reference characters, and no redundant description thereof will be made. As shown in FIG. 23, the dust-proof cover 504 may be provided in a side portion 502c of the housing 502.

Providing the dust-proof cover 504 in the side portion 502c of the housing 502 allows the invention to be applied to not only a proximity projection-type projector but also other types of projector. For example, a projector that projects projection light from a position in front a screen but spaced far apart therefrom also needs to project the projection light over a wide range when the screen has a large width. In this case, the angle of incidence of the projection light incident on the cover portion may increase. Using the bent dust-proof cover 504 reduces the angle of incidence of the projection light projected across the wide range, whereby the loss due to the reflection and hence decrease in image brightness can be reduced. The side portion 502c used herein is the integrated portion formed of the four surfaces of the housing 502 except the top portion 502b and the bottom portion (not shown).

Third Embodiment

Figure 24:
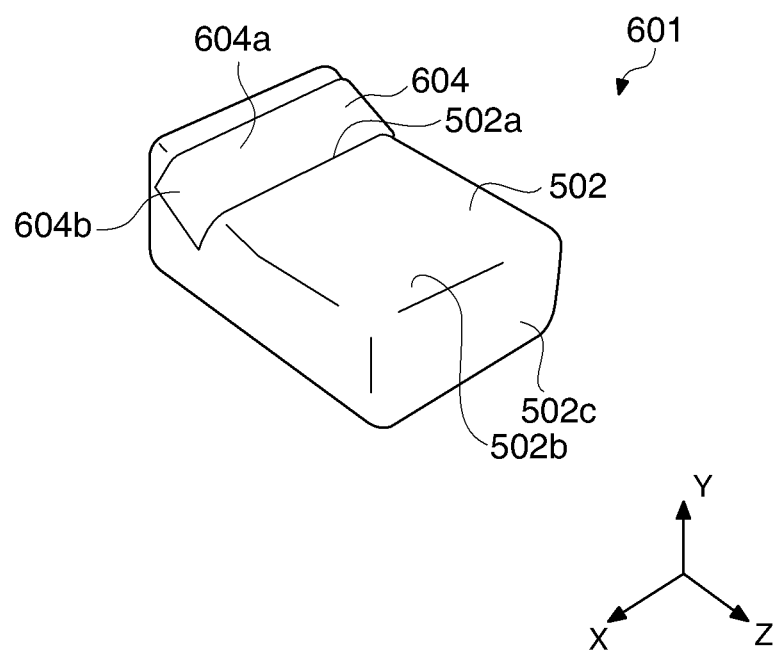
FIG. 24 is an exterior perspective view of a projector according to a third embodiment of the invention.

FIG. 24 is an exterior perspective view of a projector 601 according to a third embodiment of the invention. The components that are the same as those in the second embodiment have the same reference characters, and no redundant description thereof will be made. The projector 601 according to the third embodiment is characterized in that the surface of a central portion 604a of a dust-proof cover 604 through which the projection light exits is inclined toward the screen 510. The projector 601 is further characterized in that peripheral portions 604b of the dust-proof cover 604 are bent and inclined to the central portion 604a by 90 degrees.

Figure 25:
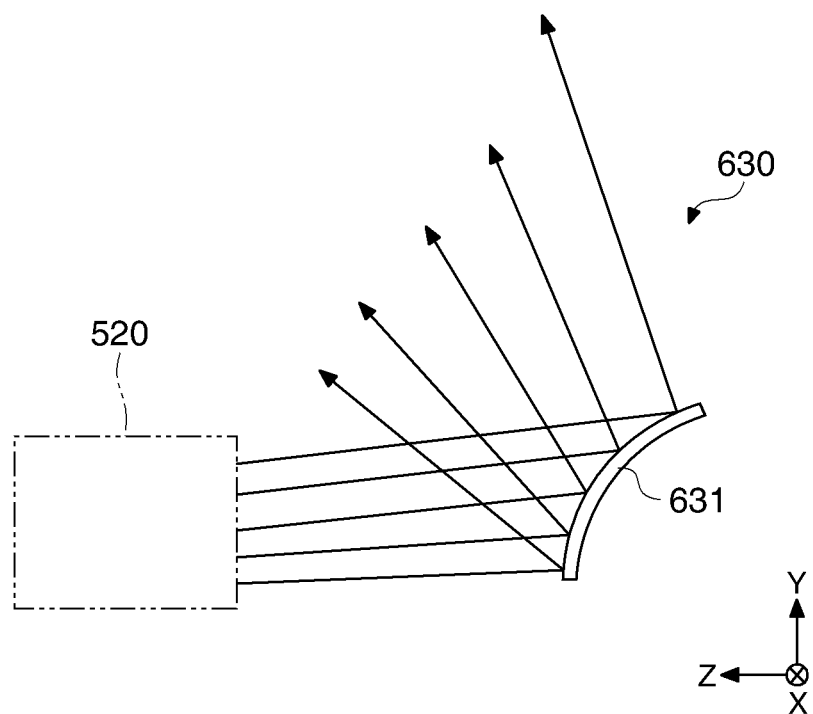
FIG. 25 is a partial enlarged view of a reflection optical unit provided in a projection system of the projector in the third embodiment.

FIG. 25 is a partial enlarged view of a reflection optical unit (wide-angle light forming reflector) 630 provided in the projection system 550 of the projector 601. The reflection optical unit 630 includes a curved mirror 631. While the curved mirror 531 described in the second embodiment has a concave shape, the curved mirror 631 in the third embodiment has a convex shape.

Since the curved mirror 631 has a convex shape, the light reflected off the curved mirror 631 does not converge but diverge. That is, the light reflected off the curved mirror 631 spreads across a wide range even in a position that is not greatly spaced apart from the curved mirror 631 as compared to the case where the light is reflected off the concave curved mirror 531. When the curved mirror 631 of the third embodiment is used, it is necessary to shift the projection light in the refraction optical unit 520 to a level above the optical axis OA2, but no description of the configuration of lenses for shifting the projection light and other features will be made.

Figure 26:
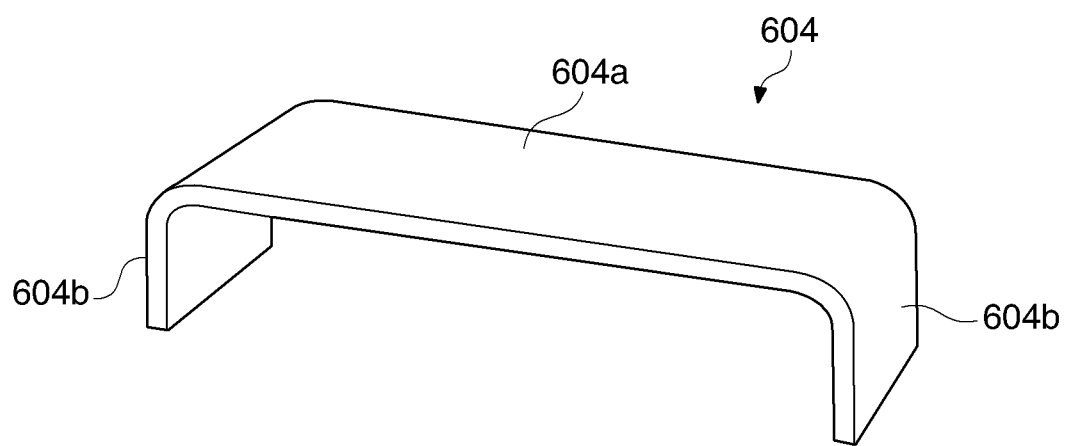
FIG. 26 shows an exterior perspective view of a dust-proof cover in the third embodiment.
Figure 27:
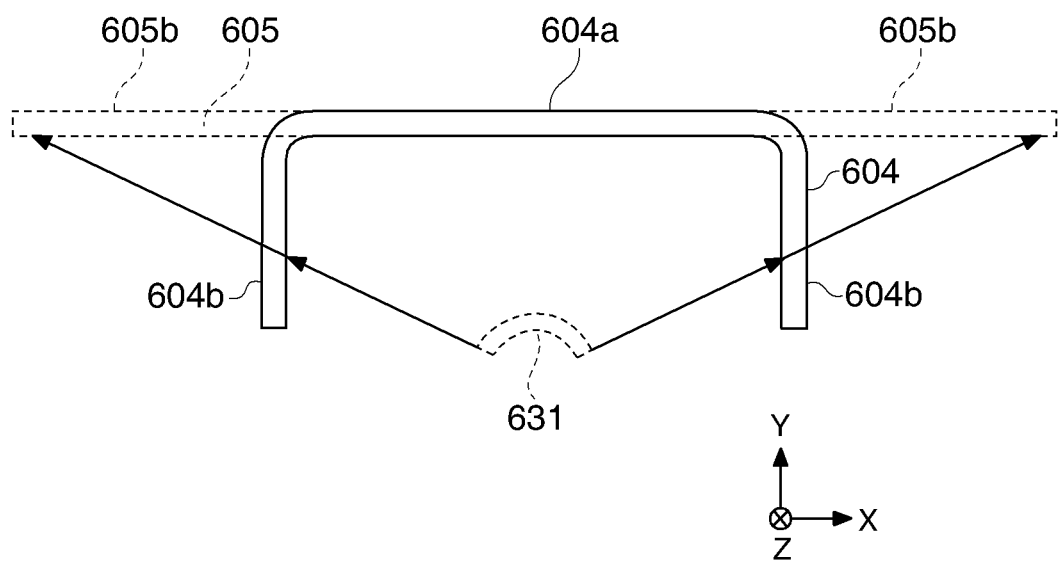
FIG. 27 is a front view of the dust-proof cover in the third embodiment.

FIG. 26 is an exterior perspective view of the dust-proof cover 604 used in the projector 601. FIG. 27 is a front view of the dust-proof cover 604. The peripheral portions 604b of the dust-proof cover 604 are bent and inclined to the central portion 604a by approximately 90 degrees. In FIG. 27, the dashed line indicates a dust-proof cover 605 having no peripheral bent portions but having an entirely flat single light-incident surface. As clearly shown in FIG. 27, bending the peripheral portions 604b by approximately 90 degrees allows the projection light spreading across a wide range to be transmitted to the dust-proof cover 604 configured in a more compact manner than that of the dust-proof cover 605 having an entirely flat single light-incident surface. Further, since the peripheral portions 604b are bent, the loss of light due to the reflection and hence the decrease in image brightness can be reduced.

Figure 28:
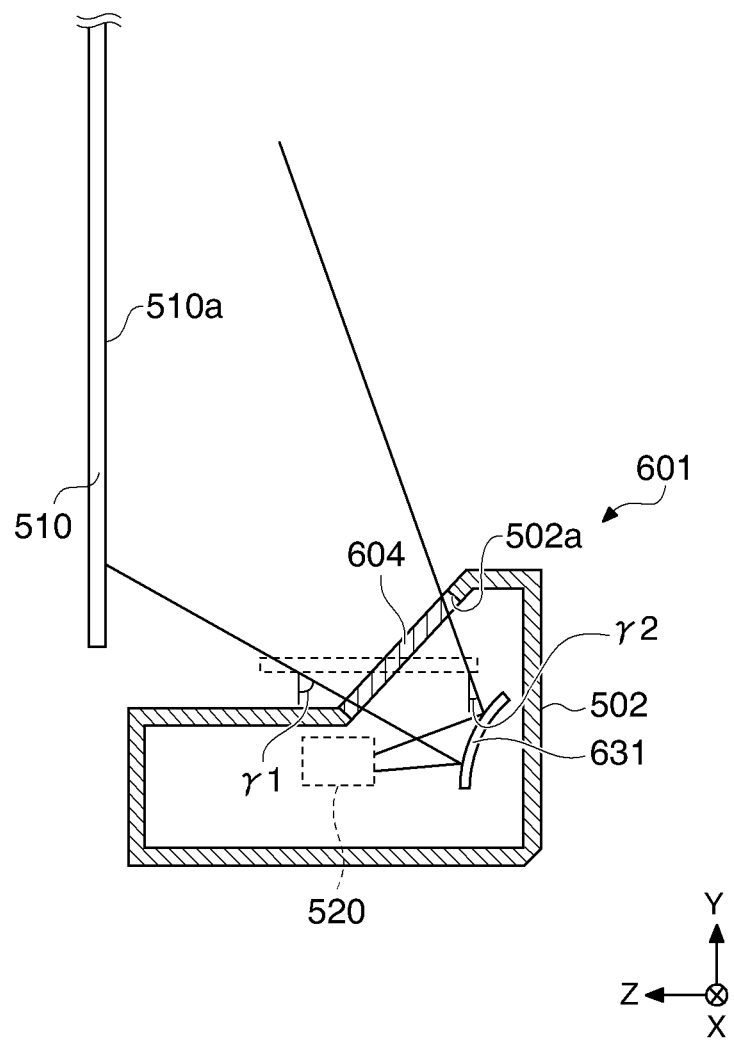
FIG. 28 is a transverse cross-sectional view but does not show the interior configuration of the projector in the third embodiment.

The inclination of the central portion 604a of the dust-proof cover 604 will next be described. FIG. 28 is a transverse cross-sectional view of the projector 601 but does not show the interior configuration thereof. The dust-proof cover 604 is attached to the housing 502 in such a way that the surface of the central portion 604a through which the projection light exits faces the screen 510.

As described above, bending the peripheral portions 604b of the dust-proof cover 604 prevents the decrease in image brightness due to the fact that the angle of incidence spreads across a range in the XY plane. Further, since the dust-proof cover is inclined in the third embodiment so that the surface of the central portion 604a through which the projection light exits faces the screen 510, the fact that the angle of incidence spreads across a range in the YZ plane will not be a problem. In particular, since a proximity projection-type projector is, in general, installed below the screen 510, the projection light exits through the top portion 502b of the housing 502 and travels toward the screen obliquely to some extent. In FIG. 28, the dashed line indicates the dust-proof cover 605 with the light exiting-side surface thereof uninclined. As shown in FIG. 28, the angle of incidence in the YZ plane at which the projection light is incident on the dust-proof cover 605 with the light exiting-side surface thereof uninclined ranges from γ1 to γ2, resulting in a large variation. At a large angle of incidence, for example, γ1, image brightness disadvantageously decreases. Since the dust-proof cover 604 according to the third embodiment is inclined in such a way that the surface through which the projection light exits faces the screen 510, the inclination cancels the increase in the angle of incidence. That is, simply inclining the dust-proof cover 604 can prevent the decrease in image brightness. Further, even when the curved mirror has a concave shape, inclining the dust-proof cover cancels the increase in the angle of incidence in the YZ plane.

Figure 29:
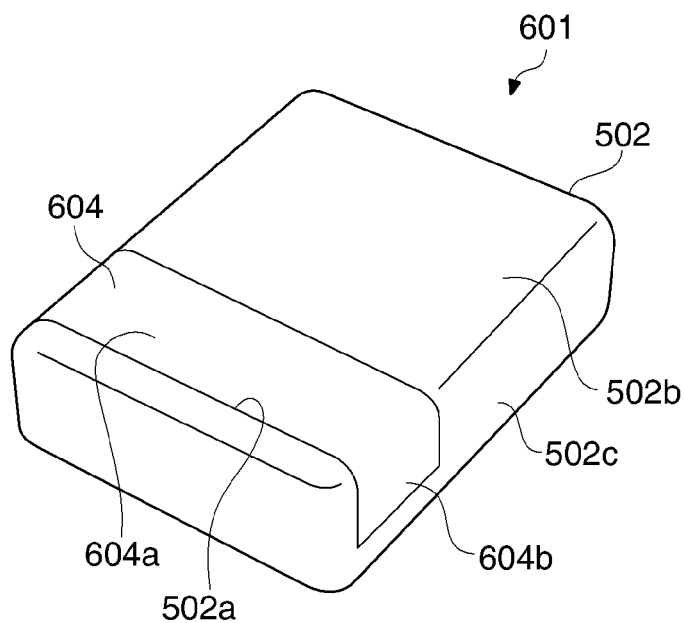
FIG. 29 is an exterior perspective view of a projector according to a first variation of the third embodiment.

FIG. 29 is an exterior perspective view of the projector 601 according to a first variation of the third embodiment. The portions that are the same as the components described above have the same reference characters, and no redundant description thereof will be made. In the projector 601 according to the first variation, the central portion 604a of the dust-proof cover 604 is substantially parallel to the top portion 502b of the housing 502, and the central portion 604a is flush with the top portion 502a. The peripheral portions 604b of the dust-proof cover 604 are substantially parallel to the side portion 502c of the housing 502, and the peripheral portions 604b are flush with the side portion 502c.

As described above, since the central portion 604a and the peripheral portions 604b are substantially parallel to the top portion 502a and the side portion 502c, respectively, which are part of the outer surfaces of the housing 502, the projector can be designed with no constraint and the degree of design freedom can be increased as compared to, for example, a case where a dome-shaped dust-proof cover is employed. Further, since the central portion 604a is flush with the corresponding one of the outer surfaces of the housing 502, the projector 601 can have a novel exterior, and the dust-proof cover 604 can be integrated with the housing 502. Integrating the dust-proof cover 604 with the housing 502 contributes to cost reduction because the number of assembly steps and the number of parts are reduced. When the dust-proof cover 604 is integrated with the housing 502, only the dust-proof cover can transmit light by forming the entire structure with a transparent member and painting the portion other than the dust-proof cover 604.

Figure 30:
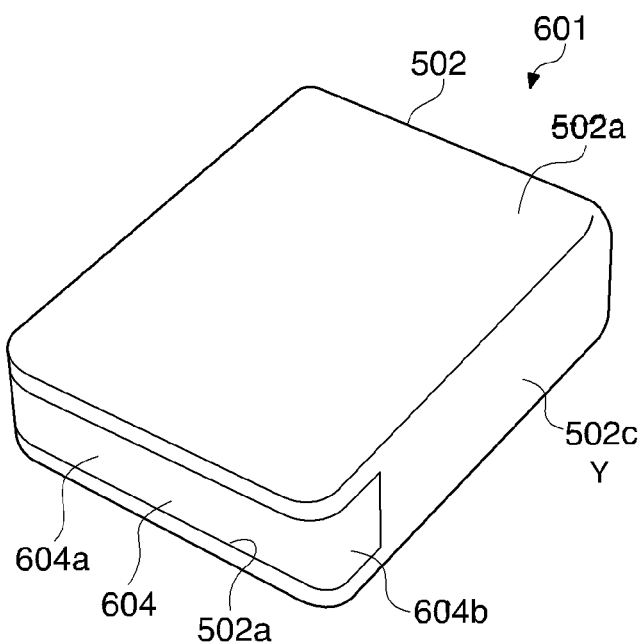
FIG. 30 is an exterior perspective view of a projector according to a second variation of the third embodiment.

FIG. 30 is an exterior perspective view of the projector 601 according to a second variation of the third embodiment. The portions that are the same as the components described above have the same reference characters, and no redundant description thereof will be made. In the projector 601 of the second variation, the central portion 604a of the dust-proof cover 604 is substantially parallel to the side portion 502a of the housing 502, and the central portion 604a is flush with the side portion 502a. The peripheral portions 604b of the dust-proof cover 604 are also substantially parallel to the side portion 502c of the housing 502, and the peripheral portions 604b are flush with the side portion 502c.

Providing the dust-proof cover 604 in the side portion 502c of the housing 502 allows the invention to be applied to not only a proximity projection-type projector but also other types of projectors. For example, a projector that projects projection light from a position in front a screen but spaced far apart therefrom also needs to project wide-angle projection light when the screen has a large width.

When the convex curved mirror 631 is used to form wide-angle projection light, the light reflected off the curved mirror 631 spreads across a wide range even in a position that is not greatly spaced apart from the curved mirror 631. In this case as well, using the bent dust-proof cover 604 can reduce the loss due to the reflection of the wide-angle projection light and hence the decrease in image brightness. To form wide-angle projection light, the convex curved mirror 631 is not necessarily used. For example, when a shift optical system is used to form wide-angle projection light, the projection light may spread across a wide range. In this case as well, using the bent dust-proof cover 604 can reduce the loss due to the reflection of the projection light and hence the decrease in image brightness.

Since the central portion 604a and the peripheral portions 604b are substantially parallel to the side portion 502c, which is part of the outer surfaces of the housing 502, the projector can be designed with no constraint and the degree of design freedom can be increased as compared, for example, to a case where a dome-shaped dust-proof cover is employed. Further, since the central portion 604a is flush with the corresponding one of the outer surfaces of the housing 502, the projector 601 can have a novel exterior, and the dust-proof cover 604 can be integrated with the housing 502. Integrating the dust-proof cover 604 with the housing 502 contributes to cost reduction because the number of assembly steps and the number of parts are reduced. When the dust-proof cover 604 is integrated with the housing 502, only the dust-proof cover 604 can transmit light by forming the entire structure with a transparent member and painting the portion other than the dust-proof cover 604.

The entire disclosure of Japanese Patent Application Nos. 2008-332966, filed Dec. 26, 2008 and 2008-332967, filed Dec. 26, 2008 is expressly incorporated by reference herein.

What is claimed is:

1. A projector comprising:
a projection unit that projects projection light toward an illuminated surface;
a housing that houses the projection unit and has an opening that allows the projection light to exit outward toward the illuminated surface disposed exterior to the housing; and
a cover portion that blocks the opening and transmits the projection light through a light-incident surface formed on an exterior surface of the cover portion,
wherein the cover portion has a plurality of areas,
wherein an area adjacent to the one of the plurality of areas modifies the reflectance of the projection light on the light-incident surface at an angle within a range different from the predetermined range,
wherein one of the plurality of areas is set as a reference area when the light incident surface of the reference area prevents the reflection of the projection light incident at an angle of incidence within the predetermined range, and
wherein, in an area that is further away from the reference area, the light-incident surface of the area prevents the reflection of the projection light incident at a larger angle of incidence.

2. The projector according to claim 1,
wherein the plurality of areas in the cover portion is set based on the angle of incidence of the projection light, and
wherein an anti-reflection effect of the light-incident surfaces of the areas of the cover portion is different depending on the area.

3. The projector according to claim 1,
wherein the cover portion has a substantially rectangular shape in the plan view and the plurality of areas is formed by dividing the light-incident surface into three in the longitudinal direction of the substantially rectangular shape,
the reference area is the central area of the plurality of areas in the longitudinal direction, and
the light-incident surface of the areas on both sides of the reference area prevent the reflection of the projection light incident at an angle of incidence within a range that include angle larger than angle within the predetermined range.

4. The projector according to claim 1,
wherein the cover portion has a substantially rectangular shape in the plan view and the plurality of areas is formed by dividing the light-incident surface into two in the short-side direction of the substantially rectangular shape,
wherein the light-incident surface of one of the areas prevents the reflection of the projection light incident at an angle of incidence within the predetermined range, and
wherein the light-incident surface of another one of areas prevents the reflection of the projection light incident at an angle of incidence beyond the predetermined range.

5. The projector according to claim 1,
wherein the light-incident surfaces of the plurality of areas includes an anti-reflection films that prevent the reflection of the projection light incident thereon.

6. The projector according to claim 5,
wherein the anti-reflection films of each of the areas overlap with each other at the boundary between adjacent ones of the areas.

7. The projector according to claim 1,
wherein the projection unit includes a wide-angle light forming reflector that converts an image of the projection light into a wide-angle image.

8. The projector according to claim 1,
wherein the cover portion has a substantially uniform thickness and the plurality of areas is formed of a central portion and peripheral portions adjacent to the central portion, and
the peripheral portions are bent toward the side where the projection light is incident.

9. The projector according to claim 8,
wherein the central portion is formed of a flat surface.

10. The projector according to claim 9,
wherein each of the peripheral portions is formed of a flat surface.

11. The projector according to claim 10,
wherein the central portion has a substantially rectangular shape in the plan view, and
the peripheral portions are connected only to a pair of sides of the central portion that face each other.

12. The projector according to claim 9,
wherein the central portion is substantially parallel to a predetermined flat surface of the outer surfaces of the housing.

13. The projector according to claim 10,
wherein each of the peripheral portions is substantially parallel to a predetermined flat surface of the outer surfaces of the housing.

14. The projector according to claim 8,
wherein the projection unit includes a wide-angle light forming reflector that forms a wide-angle image.

15. The projector according to claim 8,
wherein the cover portion is inclined in such a way that the surface of the central portion through which the projection light exits faces the illuminated surface.

16. The projector according to claim 14,
wherein the peripheral portions are bent and inclined to the central portion by approximately 90 degrees.

17. The projector according to claim 15,
wherein the peripheral portions are bent and inclined to the central portion by approximately 90 degrees.

* * * * *